US007208097B2

(12) United States Patent
Kanekiyo et al.

(10) Patent No.: US 7,208,097 B2
(45) Date of Patent: *Apr. 24, 2007

(54) IRON-BASED RARE EARTH ALLOY NANOCOMPOSITE MAGNET AND METHOD FOR PRODUCING THE SAME

(75) Inventors: Hirokazu Kanekiyo, Kyoto (JP); Toshio Miyoshi, Ibaraki (JP); Satoshi Hirosawa, Otsu (JP)

(73) Assignee: Neomax Co., Ltd., Osaka (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/381,005

(22) PCT Filed: May 8, 2002

(86) PCT No.: PCT/JP02/04499

§ 371 (c)(1),
(2), (4) Date: Mar. 20, 2003

(87) PCT Pub. No.: WO02/093591

PCT Pub. Date: Nov. 21, 2002

(65) Prior Publication Data

US 2004/0020569 A1 Feb. 5, 2004

(30) Foreign Application Priority Data

May 15, 2001 (JP) .............................. 2001-144076
Nov. 22, 2001 (JP) .............................. 2001-357785

(51) Int. Cl.
*H01F 1/28* (2006.01)
*H01F 1/057* (2006.01)
(52) U.S. Cl. .............................. 252/62.53; 252/62.54; 158/301; 420/83; 420/121

(58) Field of Classification Search ................ 148/302, 148/301; 420/83, 121; 252/62.54, 62.55, 252/62.53
See application file for complete search history.

(56) References Cited

U.S. PATENT DOCUMENTS 4,585,473 A 4/1986 Narasimhan et al.

(Continued)

FOREIGN PATENT DOCUMENTS

DE 19739959 3/1998

(Continued)

OTHER PUBLICATIONS

Kanekiyo et al., English language machine translation of Japanese Patent Dcoument No. 2002-64009.*

(Continued)

*Primary Examiner*—John P. Sheehan
(74) *Attorney, Agent, or Firm*—Keating & Bennett, LLP

(57) ABSTRACT

An iron-based rare earth alloy nanocomposite magnet has a composition represented by $(Fe_{1-m}T_m)_{100-x-y-z}Q_xR_yTi_z$, where T is Co and/or Ni, Q is B and/or C and R is rare earth element(s) including substantially no La or Ce. x, y, z and m satisfy 10 at $\%<x\leq17$ at %, 7 at $\%\leq y<10$ at %, 0.5 at $\%\leq z\leq6$ at % and $0\leq m\leq0.5$, respectively. The magnet includes crystal grains of an $R_2T_{14}Q$ type compound having an average grain size of 20 nm to 200 nm and a ferromagnetic iron-based boride that exists in a grain boundary between the crystal grains of the $R_2T_{14}Q$ type compound. The boride is dispersed in, or present in the form of a film over, the grain boundary to cover at least partially the surface of the crystal grains of the $R_2T_{14}Q$ type compound.

19 Claims, 8 Drawing Sheets

U.S. PATENT DOCUMENTS

| | | | |
|---|---|---|---|
| 4,597,938 A | 7/1986 | Matsuura et al. | |
| 4,664,724 A | 5/1987 | Mizoguchi et al. | |
| 4,770,723 A | 9/1988 | Sagawa et al. | |
| 4,802,931 A | 2/1989 | Croat | |
| 4,836,868 A | 6/1989 | Yajima et al. | |
| 4,845,837 A | 7/1989 | Loyd | |
| 4,935,074 A | 6/1990 | De Mooij et al. | |
| 4,994,109 A | 2/1991 | Willman et al. | |
| 5,022,939 A | 6/1991 | Yajima et al. | |
| 5,049,203 A | 9/1991 | Mukai et al. | |
| 5,049,208 A | 9/1991 | Yajima et al. | |
| 5,190,684 A | 3/1993 | Yamashita et al. | |
| 5,209,789 A | 5/1993 | Yoneyama et al. | |
| 5,225,004 A | 7/1993 | O'Handley et al. | |
| 5,230,749 A | 7/1993 | Fujimura et al. | |
| 5,240,513 A | 8/1993 | McCallum et al. | |
| 5,595,608 A | 1/1997 | Takebuchi et al. | |
| 5,597,425 A | 1/1997 | Akioka et al. | |
| 5,665,177 A | 9/1997 | Fukuno et al. | |
| 5,666,635 A | 9/1997 | Kaneko et al. | |
| 5,725,792 A | 3/1998 | Panchanathan | |
| 5,834,663 A | 11/1998 | Fukuno et al. | |
| 5,872,501 A | 2/1999 | Hamano et al. | |
| 5,905,424 A | 5/1999 | Panchanathan | |
| 6,022,424 A | 2/2000 | Sellers et al. | |
| 6,172,589 B1 | 1/2001 | Fujita et al. | |
| 6,183,571 B1 | 2/2001 | Inoue et al. | |
| 6,183,572 B1 | 2/2001 | Panchanathan et al. | |
| 6,280,536 B1 | 8/2001 | Inoue et al. | |
| 6,302,972 B1 | 10/2001 | Hirosawa et al. | |
| 6,332,933 B1 | 12/2001 | Ma et al. | |
| 6,352,599 B1 | 3/2002 | Chang et al. | |
| 6,386,269 B1 | 5/2002 | Kanekiyo et al. | |
| 6,471,786 B1 | 10/2002 | Shigemoto et al. | |
| 6,478,889 B2 | 11/2002 | Kanekiyo | |
| 6,648,984 B2 | 11/2003 | Takaki et al. | |
| 6,706,124 B2 * | 3/2004 | Kanekiyo et al. | 148/302 |
| 6,790,296 B2 * | 9/2004 | Kanekiyo et al. | 148/302 |
| 6,796,363 B2 | 9/2004 | Arai et al. | |
| 6,814,776 B2 * | 11/2004 | Kanekiyo et al. | 75/244 |
| 6,890,392 B2 | 5/2005 | Kanekiyo et al. | |
| 2001/0015239 A1 | 8/2001 | Kanekiyo | |
| 2002/0017339 A1 | 2/2002 | Kanekiyo et al. | |
| 2002/0117235 A1 | 8/2002 | Kanekiyo et al. | |
| 2003/0136468 A1 | 7/2003 | Kanekiyo et al. | |
| 2004/0051614 A1* | 3/2004 | Kanekiyo et al. | 335/302 |
| 2004/0099346 A1* | 5/2004 | Nishiuchi et al. | 148/302 |
| 2004/0134567 A1* | 7/2004 | Kanekiyo et al. | 148/302 |
| 2004/0194856 A1* | 10/2004 | Miyoshi et al. | 148/105 |
| 2005/0040923 A1* | 2/2005 | Miyoshi et al. | 335/302 |

FOREIGN PATENT DOCUMENTS

| | | |
|---|---|---|
| EP | 0 197 712 | 10/1986 |
| EP | 0 302 395 | 2/1989 |
| EP | 0 529 148 A2 | 3/1993 |
| EP | 0 632 471 A2 | 1/1995 |
| EP | 0 874 375 A1 | 10/1998 |
| EP | 0 959 478 A1 | 11/1999 |
| EP | 1 018 751 A1 | 7/2000 |
| EP | 1 061 532 A1 | 12/2000 |
| EP | 1 158 545 | 11/2001 |
| EP | 1 207 537 | 5/2002 |
| EP | 1 371 434 A1 | 12/2003 |
| HU | 199904 | 1/1989 |
| JP | 59-046008 | 3/1984 |
| JP | 60-009852 A1 | 1/1985 |
| JP | 61-140350 | 6/1986 |
| JP | 62-062503 | 3/1987 |
| JP | 63-155601 | 6/1988 |
| JP | 63-190138 | 8/1988 |
| JP | 63-301505 | 12/1988 |
| JP | 64-000703 | 1/1989 |
| JP | 64-007501 | 1/1989 |
| JP | 64-007502 | 1/1989 |
| JP | 64-081301 | 3/1989 |
| JP | 01-100242 | 4/1989 |
| JP | 01-162702 | 6/1989 |
| JP | 01-204401 | 8/1989 |
| JP | 02-247307 | 10/1990 |
| JP | 2-298003 * | 12/1990 |
| JP | 02-298003 A1 | 12/1990 |
| JP | 3-260018 | 11/1991 |
| JP | 3-261104 | 11/1991 |
| JP | 03-264653 | 11/1991 |
| JP | 04-147604 | 5/1992 |
| JP | 5-269549 | 10/1993 |
| JP | 05-315174 | 11/1993 |
| JP | 06-32471 | 2/1994 |
| JP | 06-140235 | 5/1994 |
| JP | 06-338407 | 12/1994 |
| JP | 7-122412 | 5/1995 |
| JP | 07-226312 | 8/1995 |
| JP | 08-053710 | 2/1996 |
| JP | 08-124730 | 5/1996 |
| JP | 08-162312 | 6/1996 |
| JP | 08-167515 | 6/1996 |
| JP | 08-322175 | 12/1996 |
| JP | 09-155507 | 6/1997 |
| JP | 09-155513 | 6/1997 |
| JP | 10-53844 | 2/1998 |
| JP | 10-088294 | 4/1998 |
| JP | 10-282790 | 10/1998 |
| JP | 11-8109 | 1/1999 |
| JP | 11-071646 | 3/1999 |
| JP | 11-101607 | 4/1999 |
| JP | 11-206075 | 7/1999 |
| JP | 11-323509 | 11/1999 |
| JP | 2000-079449 | 3/2000 |
| JP | 2000-079451 | 3/2000 |
| JP | 2000-234137 | 8/2000 |
| JP | 2000-235909 | 8/2000 |
| JP | 2000-348919 | 12/2000 |
| JP | 2001-244107 | 9/2001 |
| JP | 2002-64009 * | 2/2002 |
| JP | 2002-80921 | 3/2002 |
| JP | 2002-175908 | 6/2002 |
| JP | 2002-212686 | 7/2002 |
| JP | 2002-239688 | 8/2002 |
| JP | 2002-302702 | 10/2002 |
| KR | 1998-016178 A1 | 5/1998 |
| KR | 10-0201601 A1 | 3/1999 |
| RU | 2136069 | 8/1999 |
| WO | WO 99/21196 | 4/1999 |
| WO | WO 00/03403 | 1/2000 |
| WO | WO 00/52715 | 2/2000 |
| WO | WO 00/45397 | 8/2000 |
| WO | WO 00/52713 | 9/2000 |
| WO | WO 01/68297 | 9/2001 |
| WO | WO 02/067275 | 8/2002 |
| WO | WO 02/093591 | 11/2002 |

OTHER PUBLICATIONS

Database WPI, Section Ch, Week 200059, Derwent Publications Ltd., London, GB; class L03, AN 2000-614909 XP002210940 & JP 2000 234137 A (Sumitomo Special Metals Co Ltd), Aug. 29, 2000, abstract.

Lewis L H et al, "Compositional Clustering in ND2FE14B Melt-Spun Ribbons" Journal of Applied Physics, American Institute of Physics. New York, US, vol. 87, No. 9, May 1, 2000, pp. 4735-4737.

Patent Abstracts of Japan, vol. 015, No. 078 (E-1037), Feb. 22, 1991 & JP 02 298003 A (Fuji Elelctrochem Co Ltd), Dec. 10, 1990.

R. Coehoorn et al.: "Novel Permanent Magnetic Materials Made by Rapid Quenching"; Journal De Physique; C8, Dec. 1988, pp. 669-670.

W. C. Chang et al.: "The Effects of Refractory Metals on the Magnetic Properties of $\alpha$—Fe/$R_2Fe_{14}B$—Type Nanocomposites"; IEEE Transactions on Magnetics; Sep. 1999; vol. 35 No. 5; IEMGAQ; pp. 3265-3267.

Chang et al., "High Performance $\alpha$-Fe/$Nd_2Fe_{14}B$-type Nanocomposites", pp. 121-123, Jan. 1998, Applied Physics Letters, vol. 72, No. 1.

Chang et al., "Magnetic and Microstructure Studies of Boron-Enriched$(Nd_{0.95}La_{0.05})_{11}Fe_{76.5-x}Co_xTi_2B_{10.5}$(x=0-15) Melt-Spun Ribbons", pp. 3312-3314, Sep. 2000, IEEE Transactions on Magnetics, vol. 36, No. 5.

Chang et al., "The Effect of La-Substitution on the Microstructure and Magnetic Properties of Nanocomposite NdFeB Melt Spun Ribbons", pp. 65-70, Mar. 1997, Journal of Magnetism and Magnetic Materials, vol. 167, Nos. 1-2.

Chang et al., "High Performance $\alpha$-Fe/$R_2Fe_{14}B$-Type Nanocomposites with Nominal Compositions of $(Nd,La)_{9.5}Fe_{78-x}Co_xCr_2B_{10.5}$", Journal of Magnetism and Magnetic Materials, vol. 189, No. 1 (1998), pp. 55-61.

Chang, et al., "The effect of boron and rare earth contents on the magnetic properties of La and Cr substituted $\alpha$-Fe/$R_2Fe_{14}B$-Type Nanocomposites", Journal of Applied Physics, vol. 83, No. 11, Jun. 1998 pp. 6271-6273.

Chiriac et al., "$ND_8Fe_{93}Co_5HF_2B_{12}$ Strip Cast Alloy", pp. 5338-5340, May 2000, Journal of Applied Physics, vol. 87, No. 9.

D.J. Branagan, et al., "A New Generation of Gas Atomized Powder with Improved Levels of Energy Product and Processability", IEEE Transacttions of Magnetics, vol. 32, No. 5, Sep. 1996, pp. 5097-5099.

Hermann et al., "Growth Kinetics in Undercooled Nd-Fe-B Alloys with Carbon and Ti or Mo Additions" pp. 82-86, Apr. 2000, Journal of Magnetism and Magnetic Materials, vol. 213, Nos. 1-2.

J. Bernardi, et al., "Microstructural analysis of strip cast Nd-Fe-B alloys for high $(BH)_{max}$ magnets", Journal of Applied Physics, vol. 83 No. 11, Jun. 1998, pp. 6396-6398.

L. Henderson Lewis et al., "Phase Composition and Magnetic Characteristics of Inert Gas-Atomized RE-Fe-B-Based Powders", IEEE Transactions on Magnetics, vol. 31, No. 6, Nov. 1995, pp. 3641-3643.

M.J. Kramer et al., "A Generalized Solidification Model and Microstructural Verification for the Nd-Fe-B-Ti-C System Processed by Rapid Solidification", J. Appl. Phys. 81(8), Apr. 1997. pp. 4459-4461.

Merkulova et al., "The Temperature Dependence of Coercivity in Nancrystallyne Nd-Fe-B-(TiC) Magnets", Journal of Applied Physics, vol. 87, No. 9, (2000), pp. 4738-4740.

Missell et al., "Rare-Earth Magnets and Their Applications," Proceedings of the 14th International Workshop, Sep. 1996, pp. 28-37, vol. 1, World Scientific, Singapore, new Jersey, London, Hong Kong.

Q. Chen, et al., "A Study on the Phase Transformation and Exchange-coupling of $(Nd_{0.95}La_{0.05})_{9.5}Fe_{bal}Co_5Nb2B_{10.5}$ Nanaocomposites, Materials Research Society Symposium Proceedings", Vo. 577, Apr. 1999, pp. 209-219.

R. Coehoorn, et al., "Novel Permanent Magnetic Materials Made by Rapid Quenching", Journal de Physique, C8, Dec. 1988, pp. 669-670.

Yao, J.M. et al, "Coercivity of Ti-modified ($\alpha$-Fe)-$Nd_2Fe_{14}B$ Nanocrystalline Alloys", Journal of Applied Physics, Nov. 15, 1994, pp. 7071-7073, vol. 76, No. 10, American Institute of Physics, Woodbury, New York, USA.

Z.S. Wronski, "Microstructure and Magnetic Properties of Low-Neodymium Nd-Fe-B-Si Magnets Produced from HP Gas Atomized Powder", J. Appl. Phys. 69(8), Apr. 1991, pp. 5507-5509.

Fumitoshi Yamashita, "Applications of Rare-Earth Magnets to the Small Motor Industry", Proceeding of the Seventeenth International Workshop, Aug. 18-22, 2002, Newark, Delaware, USA, pp. 100-111.

U.S. Appl. No. 10/432,862, filed May 28, 2003. "Nanocomposite magnet.".

U.S. Appl. No. 10/484,072. Filed Jan. 16, 2004. "Method for producing nanocomposite magnet using atomizing method."

U.S. Appl. No. 10/642,324, filed Aug. 18, 2003. "Compound for rare-earth bonded magnet and bonded magnet using the compound."

U.S. Appl. No. 10/745,834, filed Dec. 24, 2003. "Permanent magnet including multiple ferromagnetic phases and method for producing the magnet."

U.S. Appl. No. 09/863,902, filed May 24, 2001. "Permanent magnet including multiple ferromagnetic phases and method for producing the magnet.", now U.S. Pat. 6,706,124.

U.S. Appl. No. 09/986,390, filed Nov. 8, 2001. "Nanocomposite magnet and method for producing same.",now U.S. Pat. 6,790,296.

US 4,756,775, 07/1988, Croat (withdrawn)

* cited by examiner $R_2Fe_{14}B$  Fe-B

Fe-B  $R_2Fe_{14}B$

200nm

IRON-BASED RARE EARTH ALLOY NANOCOMPOSITE MAGNET AND METHOD FOR PRODUCING THE SAME

BACKGROUND OF THE INVENTION

1. Field of the Invention

The present invention generally relates to a method for producing a permanent magnet, for use in, for example, motors and actuators of various types. More particularly, the present invention relates to a method for producing an iron-based rare earth alloy nanocomposite magnet including multiple ferromagnetic phases.

2. Description of the Related Art

Recently, it has become more and more necessary to further improve the performance of, and further reduce the size and weight of, consumer electronic appliances, office automation appliances and various other types of electronic equipment. For these purposes, a permanent magnet for use in each of these appliances is required to maximize its performance to weight ratio when operated as a magnetic circuit. For example, a permanent magnet with a remanence $B_r$ of about 0.5 T or more is now in high demand. Hard ferrite magnets have been used widely because magnets of this type are relatively inexpensive. However, the hard ferrite magnets cannot achieve the high remanence $B_r$ of about 0.5 T or more.

An Sm—Co based magnet, produced by a powder metallurgical process, is currently known as a typical permanent magnet that achieves the high remanence $B_r$ of about 0.5 T or more. However, the Sm—Co based magnet is expensive, because Sm and Co are both expensive materials.

Examples of other high-remanence magnets include an Nd—Fe—B based sintered magnet produced by a powder metallurgical process and an Nd—Fe—B based rapidly solidified magnet produced by a melt quenching process. An Nd—Fe—B based sintered magnet is disclosed in Japanese Laid-Open Publication No. 59-46008, for example, and an Nd—Fe—B based rapidly solidified magnet is disclosed in Japanese Laid-Open Publication No. 60-9852, for instance.

The Nd—Fe—B based sintered magnet is mainly composed of relatively inexpensive Fe (typically at about 60 wt % to about 70 wt % of the total weight), and is much less expensive than the Sm—Co based magnet. Nevertheless, it is still expensive to produce the Nd—Fe—B based sintered magnet. This is partly because huge equipment and a great number of manufacturing and processing steps are required to separate and purify, or to obtain by reduction reaction, Nd, which usually accounts for about 10 at % to about 15 at % of the magnet. Also, a powder metallurgical process normally requires a relatively large number of manufacturing and processing steps by its nature.

Compared to an Nd—Fe—B based sintered magnet formed by a powder metallurgical process, an Nd—Fe—B based rapidly solidified magnet can be produced at a lower cost by a melt quenching process. This is because an Nd—Fe—B based rapidly solidified magnet can be produced through relatively simple process steps of melting, melt quenching and heat treating. However, to obtain a permanent magnet of melt-quenched materials in bulk, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

For these reasons, an Nd—Fe—B based rapidly solidified magnet produced by a melt quenching process has a remanence $B_r$ that is lower than that of a magnetically anisotropic Nd—Fe—B based sintered magnet produced by a powder metallurgical process.

As disclosed in Japanese Laid-Open Publication No. 1-7502, a technique of adding, in combination, at least one element selected from the group consisting of Zr, Nb, Mo, Hf, Ta and W and at least one more element selected from the group consisting of Ti, V and Cr to the material alloy effectively improves the magnetic properties of an Nd—Fe—B based rapidly solidified magnet. When these elements are added to the material alloy, the magnet has increased coercivity $H_{cJ}$ and anticorrosiveness. However, the only known effective method of improving the remanence $B_r$ is increasing the density of the bonded magnet. Also, where an Nd—Fe—B based rapidly solidified magnet includes a rare earth element at about 6 at % or more, a melt spinning process, in which a melt of its material alloy is ejected against a chill roller, has often been used in the prior art to rapidly cool and solidify the material alloy at an increased rate.

As for an Nd—Fe—B based rapidly solidified magnet, an alternative magnet material was proposed by R. Coehoorn et al., in J. de Phys, C8, 1998, pp. 669–670. The Coehoorn material has a composition including a rare earth element at a relatively low mole fraction (i.e., around $Nd_{3.8}Fe_{77.2}B_{19}$, where the subscripts are indicated in atomic percentages) and an $Fe_3B$ type compound as its main phase. This permanent magnet material is obtained by heating and crystallizing an amorphous alloy that has been prepared by a melt quenching process. Also, the crystallized material has a metastable structure in which a soft magnetic $Fe_3B$ phase and a hard magnetic $Nd_2Fe_{14}B$ phase coexist and in which crystal grains of very small sizes (typically on the order of several nanometers) are distributed finely and uniformly as a composite of these two crystalline phases. For that reason, a magnet made from such a material is called a "nanocomposite magnet". It was reported that such a nanocomposite magnet has a remanence $B_r$ as high as about 1 T or more. But the coercivity $H_{cJ}$ thereof is relatively low, i.e., from about 160 kA/m to about 240 kA/m. Accordingly, this permanent magnet material is applicable only when the operating point of the magnet is about 1 or more.

It has been proposed that various metal elements be added to the material alloy of a nanocomposite magnet to improve the magnetic properties thereof. See, for example, Japanese Laid-Open Publication No. 3-261104, U.S. Pat. No. 4,836,868, Japanese Laid-Open Publication No. 7-122412, PCT International Publication No. WO 003/03403 and W. C. Chan et. al., "The Effects of Refractory Metals on the Magnetic Properties of α-Fe/$R_2Fe_{14}B$-type Nanocomposites", IEEE Trans. Magn. No. 5, INTERMAG. 99, Kyongiu, Korea, pp. 3265–3267, 1999. However, none of these proposed techniques are reliable enough to always obtain a sufficient "characteristic value per cost". More specifically, none of the nanocomposite magnets produced by these techniques achieve a coercivity that is high enough to actually use it in various applications. Thus, none of these magnets can exhibit commercially viable magnetic properties.

SUMMARY OF THE INVENTION

In order to overcome the problems described above, preferred embodiments of the present invention provide a method for producing an iron-based alloy permanent magnet with excellent magnetic properties at a low cost and also provide a permanent magnet that achieves a coercivity $H_{cJ}$ that is high enough to actually use the magnet in various applications (e.g., $H_{cJ} \geq$ about 550 kA/m) while maintaining a remanence $B_r$ of about 0.80 T or more.

An iron-based rare earth alloy nanocomposite magnet according to a preferred embodiment of the present invention has a composition represented by the general formula $(Fe_{1-m}T_m)_{100-x-y-z}Q_xR_yTi_z$, where T is at least one element selected from the group consisting of Co and Ni, Q is at least one element selected from the group consisting of B and C, and R is at least one rare earth element including substantially no La or Ce. The mole fractions x, y, z and m preferably satisfy the inequalities of: 10 at %<x≦17 at %; 7 at %≦y<10 at %; 0.5 at %≦z≦6 at %; and 0≦m≦0.5, respectively. The magnet preferably includes crystal grains of an $R_2T_{14}Q$ type compound having an average grain size of about 20 nm to about 200 nm and a ferromagnetic iron-based boride that exists in a grain boundary between the crystal grains of the $R_2T_{14}Q$ type compound. The ferromagnetic iron-based boride is preferably dispersed in the grain boundary or present in the form of a film over the grain boundary to cover the surface of the crystal grains of the $R_2T_{14}Q$ type compound at least partially.

In a preferred embodiment of the present invention, the mole fractions x, y and z satisfy the inequalities of: 10 at %<x≦15 at %; 7 at %≦y≦9.3 at %; and 1.5 at %≦z≦5 at %.

In another preferred embodiment of the present invention, the magnet includes crystalline phases, including the $R_2T_{14}Q$ type compound and the ferromagnetic iron-based boride, at about 95 vol % or more in total and amorphous phases at about 5 vol % or less.

More particularly, the magnet preferably includes the $R_2T_{14}Q$ type compound at about 65 vol % to about 85 vol %.

In still another preferred embodiment of the present invention, the crystal grains of the $R_2T_{14}Q$ type compound have a Ti concentration of about 2 at % or less while a Ti concentration in the grain boundary between the crystal grains of the $R_2T_{14}Q$ type compound is higher than the Ti concentration inside the crystal grains of the $R_2T_{14}Q$ type compound.

Specifically, the Ti concentration in the grain boundary between the crystal grains of the $R_2T_{14}Q$ type compound is preferably about 7 at % or more.

In an additional preferred embodiment of the present invention, the ferromagnetic iron-based boride has an average size of about 50 nm or less as measured along the thickness of the grain boundary.

In yet another preferred embodiment of the present invention, the ferromagnetic iron-based boride is present in the form of a film having an average thickness of about 20 nm or less over the grain boundary between the crystal grains of the $R_2T_{14}Q$ type compound.

In a further preferred embodiment of the present invention, the ferromagnetic iron-based boride is dispersed in the grain boundary between the crystal grains of the $R_2T_{14}Q$ type compound and has an average major axis length of about 1 nm to about 50 nm.

In another preferred embodiment of the present invention, on an arbitrary cross section of the magnet, the crystal grains of the $R_2T_{14}Q$ type compound have an average size that is greater than an average size of the ferromagnetic iron-based boride.

In yet another preferred embodiment of the present invention, the mole fractions x and z satisfy the inequalities of 10 at %<x≦14 at % and 0.5 at %≦z≦4 at %.

In an additional preferred embodiment of the present invention, the iron-based boride includes $Fe_3B$ and/or $Fe_{23}B_6$.

In yet another preferred embodiment of the present invention, the magnet is in the shape of a thin strip having a thickness of about 10 μm to about 300 μm.

In yet another preferred embodiment of the present invention, the magnet has been pulverized into powder particles. In this particular preferred embodiment, the powder particles preferably have a mean particle size of about 30 μm to about 250 μm.

In yet another preferred embodiment of the present invention, the magnet has hard magnetic properties as represented by a remanence $B_r$ of about 0.80 T or more, a maximum energy product $(BH)_{max}$ of about 100 kJ/m³ or more and a coercivity $H_{cJ}$ of about 480 kA/m or more.

More specifically, the magnet preferably has hard magnetic properties as represented by a remanence $B_r$ of about 0.85 T or more and a maximum energy product $(BH)_{max}$ of about 120 kJ/m³ or more.

A bonded magnet according to a preferred embodiment of the present invention is obtained by molding a magnet powder, including a powder of the iron-based rare earth alloy magnet according to any of the preferred embodiments of the present invention described above, with a resin binder.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Figure 1A:
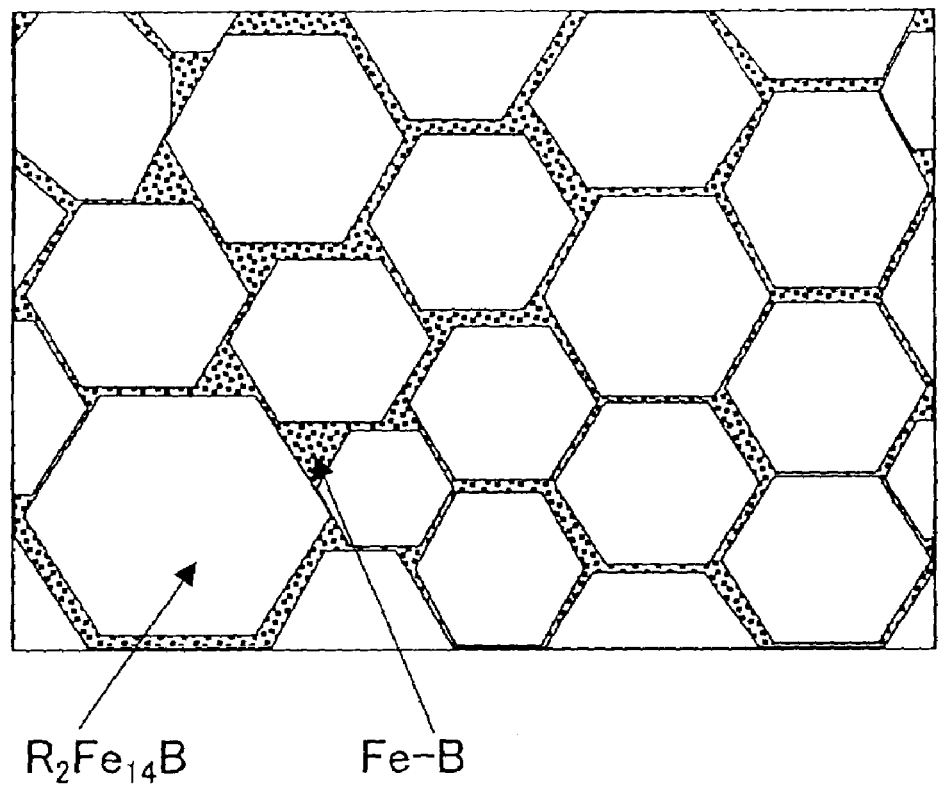
FIGS. 1A and 1B schematically illustrate the structure of an iron-based rare earth alloy nanocomposite magnet according to a preferred embodiment of the present invention.

An iron-based rare earth alloy magnet according to a preferred embodiment of the present invention is a nanocomposite magnet formed by rapidly cooling and solidifying a melt of a rare earth-iron-boron based material alloy including Ti. This rapidly solidified alloy includes nanocrystalline phases. If necessary, the rapidly solidified alloy is heated and further crystallized.

Generally speaking, if the mole fraction of a rare earth element R is set lower than about 10 at %, then an $R_2Fe_{14}B$ phase, contributing to hard magnetic properties, decreases its volume percentage. In addition, an $\alpha$-Fe phase nucleates earlier than the $R_2Fe_{14}B$ phase, and easily increases its grain size excessively. Since the $\alpha$-Fe phase has high magnetization, the magnetization of the resultant magnet increases as a whole. However, since the magnet includes the excessively large $\alpha$-Fe phase, the loop squareness of its demagnetization curve deteriorates and its coercivity also decreases. In the prior art, attempts were made to increase the coercivity by decreasing the size of each and every crystalline phase (including the $\alpha$-Fe phase that easily has an excessively large size) with the addition of some metal element. However, the resultant coercivity was still insufficient.

The present inventors discovered and confirmed via experiments that if an appropriate amount of Ti is added to a material alloy including a rare earth element R at less than about 10 at % and B at about 10 at % to about 17 at %, then crystal grains of an $R_2T_{14}Q$ type compound and an iron-based boride can be nucleated earlier and faster than the Fe phase in the molten alloy being cooled and solidified with the nucleation and excessive grain growth of the $\alpha$-Fe prevented. The present inventors also discovered that by nucleating and growing the hard magnetic phase faster and earlier than the soft magnetic phase in this manner, nuclei of the iron-based boride with ferromagnetic properties can be created in the grain boundary between the $R_2T_{14}Q$ crystals. Accordingly, if the ferromagnetic iron-based boride is grown in the crystallization process of the material alloy so as to cover the surface of the $R_2T_{14}Q$ crystal grains without increasing the interfacial energy, then the iron-based boride, grown from the multiple nuclei, are dispersed temporarily but will soon be partially combined together on the surface of the $R_2T_{14}Q$ crystal grains. As a result, the iron-based boride will form a sort of film or layer in the end. In this manner, the surface of the $R_2T_{14}Q$ crystal grains is covered with the film of the iron-based boride at least partially.

Preferred embodiments of the present invention provide a nanocomposite structure in which the $R_2T_{14}Q$ crystal grains serving as a hard magnetic phase are separated from each other by a thin film of the iron-based boride serving as a soft magnetic phase (with an average thickness of about 20 nm or less) and/or fine particles thereof (with a major-axis size of about 1 nm to about 50 nm). That is to say, along the grain boundary of the $R_2T_{14}Q$ crystal grains, the soft and hard magnetic phases are magnetically coupled together through exchange interactions. The exchange coupling between the hard and soft magnetic phases is produced mainly in their interface. Since the soft magnetic phase is present in the form of a film to cover the hard magnetic phase, the magnetic moment of most of the soft phase is magnetically constrained and therefore excellent magnetic properties are achievable. As a result, a structure that can function as an exchange spring magnet is formed. The present inventors also discovered that this magnetic coupling has been weakened by a weak magnetic phase or a non-magnetic phase existing in the grain boundary.

Figure 1B:
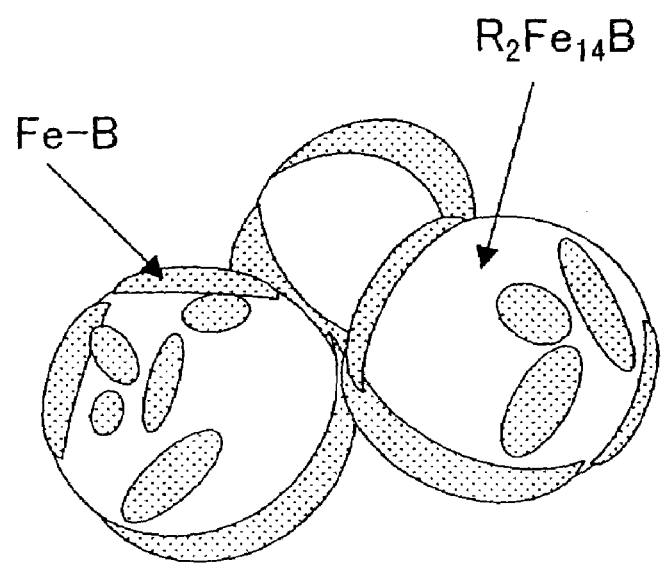

FIGS. 1A and 1B schematically illustrate the structure of a nanocomposite magnet according to a preferred embodiment of the present invention. Specifically, FIG. 1A is a cross-sectional view schematically illustrating the $R_2Fe_{14}B$ and grain boundary phases in the magnet of this preferred embodiment. As shown in FIG. 1A, an iron-based boride (Fe—B) is present in the grain boundary phase. FIG. 1B is a perspective view illustrating the $R_2Fe_{14}B$ phase and the iron-based boride. As shown in FIG. 1B, the iron-based boride is finely dispersed, and/or combined together like a film or layer, in the grain boundary, thereby partially covering the surface of the $R_2Fe_{14}B$ phase. In other words, the iron-based boride existing in the grain boundary of the $R_2Fe_{14}B$ phase is partially continuously arranged and partially discontinuously arranged.

In this manner, according to preferred embodiments of the present invention, an iron-based boride with ferromagnetic properties is grown in the grain boundary or sub-boundary between the $R_2T_{14}Q$ crystal grains so as to cover the surface of the $R_2T_{14}Q$ crystal grains at least partially. As a result, a unique nanocomposite magnet structure, in which a fine (or thin) iron-based boride is present in the grain boundary or sub-boundary between the $R_2T_{14}Q$ crystal grains, can be obtained. The term "grain boundary" used herein refers not only to "grain boundary" in the strict sense but also to any "sub-boundary".

The results of experiments conducted by the present inventors revealed that particularly when the iron-based boride with ferromagnetic properties formed a thin film over the surface of $R_2T_{14}Q$ crystal grains in the grain boundary thereof, a nanocomposite magnet with excellent magnetic properties is obtained. In preferred embodiments of the present invention, the soft magnetic phase, existing thinly in the grain boundary, preferably accounts for about 10 vol % to about 40 vol % of the entire magnet.

A structure like this is realized by nucleating and growing the $R_2T_{14}Q$ crystal grains faster and earlier than crystal grains of other soft magnetic phases through the addition of Ti and then by precipitating the iron-based boride in the gap (or in the grain boundary) between the $R_2T_{14}Q$ crystal grains. That is to say, it is not until the $R_2T_{14}Q$ crystal grains have been sufficiently nucleated and grown that the soft magnetic phase is allowed to grow in the grain boundary thereof. Accordingly, the grain growth of the soft magnetic phase in the grain boundary portion is constrained by the $R_2T_{14}Q$ crystal grains. The crystal lattice of the soft magnetic phase that has been formed in this manner does not match with that of the hard magnetic phase. The structure of this nanocomposite magnet is different from that of an $Fe_3B/R_2Fe_{14}B$ type nanocomposite magnet in this respect also. Specifically, in an $Fe_3B/R_2Fe_{14}B$ type nanocomposite magnet, including about 2 at % to about 6 at % of rare earth element R and about 15 at % to about 20 at % of boron (B), soft magnetic $Fe_3B$ phase and hard magnetic $R_2Fe_{14}B$ phase are formed through a phase transformation process. That is to say, the soft magnetic $Fe_3B$ phase precipitates before the hard magnetic $R_2Fe_{14}B$ phase nucleates. In that case, the soft magnetic phase cannot be present in the film shape.

Thus, the crystal lattice of $Fe_3B$ is observed as partially matching with that of $R_2Fe_{14}B$.

In the preferred embodiments of the present invention, as $R_2T_{14}Q$ crystal grains nucleate and grow, Ti, which has been distributed substantially uniformly in a molten alloy, is forced into, and condensed in, the grain boundary of the $R_2T_{14}Q$ crystal grains. The present inventors believe the reason is that Ti cannot exist in a chemically stabilized state inside the $R_2T_{14}Q$ crystal grains. According to the experimental data collected by the present inventors, the Ti condensed in the grain boundary phase existed at a concentration of about 5 at % to about 30 at % in the grain boundary. However, it was not clear exactly in what form Ti existed in the grain boundary phase.

Hereinafter, an iron-based rare earth alloy magnet according to preferred embodiments of the present invention will be described in further detail.

In various preferred embodiments of the present invention, the iron-based rare earth alloy magnet preferably has a composition represented by the general formula: $(Fe_{1-m}T_m)_{100-x-y-z}Q_xR_yTi_z$. In this formula, T is preferably at least one element selected from the group consisting of Co and Ni, Q is preferably at least one element selected from the group consisting of B and C, and R is preferably at least one rare earth element including substantially no La or Ce. The mole fractions x, y, z and m preferably satisfy the inequalities of 10 at %$<$x $\leq$17 at %, 7 at %$\leq$y$<$10 at %, 0.5 at %$\leq$z$\leq$6 at % and 0$\leq$m$\leq$0.5, respectively. This alloy magnet preferably includes crystal grains of an $R_2T_{14}Q$ type compound and a ferromagnetic iron-based boride that have been magnetically coupled together through exchange interaction. The ferromagnetic iron-based boride has preferably grown to form a film in the grain boundary between the $R_2T_{14}Q$ crystal grains and cover the surface of the $R_2T_{14}Q$ crystal grains as a whole.

The iron-based rare earth alloy magnet according to this preferred embodiment of the present invention preferably includes a rare earth element at less than about 10 at %. However, the iron-based boride with ferromagnetic properties has precipitated in the grain boundary of the main phase. Accordingly, the magnet can exhibit comparable (or even increased) magnetization (or remanence $B_r$) and improved loop squareness of the demagnetization curve compared to a magnet that does not contain Ti.

In the iron-based rare earth alloy magnet according to the present preferred embodiment of the present invention, the crystal grains of its main phase with ferromagnetic properties are thinly covered with the iron-based boride as a soft magnetic phase. Accordingly, the crystal grains of these two main phases are magnetically coupled together through exchange interaction. Consequently, the alloy as a whole can exhibit excellent loop squareness in its demagnetization curve.

The iron-based rare earth alloy magnet according to this preferred embodiment of the present invention preferably includes iron-based borides and $\alpha$-Fe that have saturation magnetizations approximately equal to, or even higher than, that of the $R_2T_{14}Q$ (typically, $Nd_2Fe_{14}B$) phase. Examples of the iron-based borides include $Fe_3B$ (with a saturation magnetization of about 1.5 T) and $Fe_{23}B_6$ (with a saturation magnetization of about 1.6 T). In this case, the $Nd_2Fe_{14}B$ phase has a saturation magnetization of about 1.6 T and the $\alpha$-Fe phase has a saturation magnetization of about 2.1 T.

Normally, where the mole fraction x of B is greater than about 10 at % and the mole fraction y of the rare earth element R is about 6 at % to about 8 at %, $R_2Fe_{23}B_3$ is produced unless Ti is added. However, even when a material alloy with such a composition is used, the addition of Ti can produce $R_2Fe_{14}B$, $Fe_{23}B_6$ and $Fe_3B$, not $R_2Fe_{23}B_3$, in preferred embodiments of the present invention. These iron-based borides contribute to increasing the magnetization. It should be noted that "$Fe_3B$" herein includes $Fe_{35}B$, which is hard to distinguish from $Fe_3B$.

In various preferred embodiments of the present invention, the rapidly solidified alloy has either a structure in which almost no $\alpha$-Fe phase with an excessively large grain size has precipitated but an $R_2T_{14}Q$ type phase with a very small grain size exists instead, or a structure in which an $R_2T_{14}Q$ type phase with a very small grain size and an amorphous phase coexist. As used herein, the term "amorphous phase" means not only a phase in which the atomic arrangement is sufficiently disordered, but also a phase including embryos for crystallization, extremely small crystalline regions (size: several nanometers or less), and/or atomic clusters. More specifically, the term "amorphous phase" refers to any phase having a crystal structure that cannot be defined by X-ray diffraction analysis or TEM observation. Stated otherwise, any phase having a crystal structure clearly identifiable by X-ray diffraction analysis or TEM observation will be herein referred to as a "crystalline phase".

In the prior art, if a molten alloy with a composition similar to that of the preferred embodiments of the present invention (i.e., a composition including all the elements included in the inventive composition but Ti) is cooled relatively slowly, the resultant alloy will have a structure in which a lot of $\alpha$-Fe phase has grown coarsely. Thus, when the alloy is heated and crystallized after the cooling, the $\alpha$-Fe phase will increase its grain size excessively. Once soft magnetic phases, including the $\alpha$-Fe phase, have grown too much, the magnetic properties of the alloy deteriorate significantly, thus making it virtually impossible to produce a quality permanent magnet from such an alloy.

Only when Ti is added to the material alloy, the hard magnetic phase will nucleate and grow faster and earlier than any other phase and then an iron-based boride with ferromagnetic properties will precipitate in the grain boundary between the crystal grains of the main phase. Thereafter, the iron-based boride precipitated will soon be partially combined together to form a continuous film. As a result, a structure in which the surface of the crystal grains of the main phase is thinly covered with that film is formed.

If any of the other metal elements (e.g., Nb, V, Cr, etc.), excluding Ti, is added, the grain growth of the $\alpha$-Fe phase advances remarkably in a relatively high temperature range in which the $\alpha$-Fe phase grows rapidly, and the magnetization direction of the $\alpha$-Fe phase cannot be effectively constrained by the exchange coupling between the $\alpha$-Fe and hard magnetic phases. As a result, the demagnetization curve will have greatly deteriorated loop squareness. It should be noted that even if Nb, Mo or W is added instead of Ti, good hard magnetic properties, including superior loop squareness of the demagnetization curve, are achievable by thermally annealing the alloy in a relatively low temperature range where no $\alpha$-Fe phase precipitates. In an alloy that has been annealed at such a low temperature, however, $R_2Fe_{14}B$ crystalline particles would be dispersed in non-magnetic amorphous phases and the alloy does not have large remanence $B_r$. Also, if the alloy is annealed at an even higher temperature, then the $\alpha$-Fe phase nucleates and grows out of the amorphous phases. Unlike the situation where Ti is added, the $\alpha$-Fe phase rapidly grows and increases its grain size excessively after its nucleation. As a result, the magnetization direction of the $\alpha$-Fe phase cannot be effectively constrained anymore by the exchange coupling between the α-Fe and hard magnetic phases, and the loop squareness of the demagnetization curve deteriorates considerably.

On the other hand, where V or Cr is added instead of Ti, the magnetic moment of these additive metal elements is coupled anti-ferromagnetically to the magnetic moment of Fe to form a solid solution, thus decreasing the magnetization significantly.

In contrast, where Ti is added to the material alloy, the crystallization kinetics of the α-Fe phase is slowed down, i.e., it takes a longer time for the α-Fe phase to nucleate and grow. Thus, the present inventors believe that the $Nd_2Fe_{14}B$ phase starts to nucleate and grow before the α-Fe phase has grown coarsely. For that reason, if Ti is added, crystal grains of the $Nd_2Fe_{14}B$ phase can be grown sufficiently and distributed uniformly before the α-Fe phase has grown too much.

Accordingly, only when Ti is added, the crystal grain coarsening of the α-Fe phase is minimized as intended, and therefore, iron-based borides with ferromagnetic properties can be obtained. Furthermore, Ti, as well as B and C, plays an important role as an element that delays the crystallization of Fe initial crystals (i.e., γ-Fe that will be transformed into α-Fe) and thereby facilitates the production of a supercooled liquid during the melt quenching process. Thus, even if a melt of the material alloy including Ti is rapidly cooled and solidified at a relatively low cooling rate of about $10^{2°}$ C./sec to about $10^{5°}$ C./sec, a rapidly solidified alloy, in which the α-Fe phase with an excessively large grain size has not precipitated but which includes the nanocrystalline $R_2Fe_{14}B$ phase at about 60 vol % or more (and sometimes iron-based borides as well), can be obtained.

Preferred Composition

Q may be either B (boron) only or a combination of B and C (carbon). The ratio of C to Q is preferably about 0.25 or less.

If the mole fraction x of Q is about 10 at % or less, then it is difficult to make the desired rapidly solidified alloy, in which the nanocrystalline $R_2Fe_{14}B$ and amorphous phases coexist, at the low cooling rate of about $10^{2°}$ C./sec to about $10^{4°}$ C./sec. Also, even if the rapidly solidified alloy is annealed after that, the resultant $H_{cJ}$ of the alloy will be less than about 400 kA/m. In addition, a strip casting process, which is one of the most cost-effective techniques among various rapid cooling methods, cannot be adopted in that case, and the price of the resultant permanent magnet product increases unintentionally. On the other hand, if the mole fraction x of Q exceeds about 17 at %, then the iron-based boride will start to nucleate almost simultaneously with the $R_2Fe_{14}B$ phase, and will grow excessively in the end. As a result, the desired nanocomposite structure, in which the iron-based boride phase is distributed uniformly in, or present in the form of a film disposed over the grain boundary of the $R_2Fe_{14}B$ phase, cannot be obtained, and the resultant magnetic properties deteriorate.

In view of these considerations, the mole fraction x of Q is preferably greater than about 10 at % and equal to or less than about 17 at %. A more preferable upper limit of x is about 16 at % and an even more preferable upper limit of x is about 15 at %.

The (atomic) ratio p of C to Q preferably ranges from about 0 to about 0.25. To achieve the effects expected from the additive C, the C ratio p is preferably equal to or greater than about 0.01. The reason is as follows. If p is much smaller than about 0.01, then almost no expected effects are achievable even if C is added. On the other hand, if p is far greater than about 0.25, then the volume percentage of the α-Fe phase produced increases too much, thereby causing deterioration of the resultant magnetic properties. The lower limit of the ratio p is preferably about 0.02, while the upper limit thereof is preferably about 0.20. More preferably, the ratio p is from about 0.02 to about 0.17.

R is at least one element selected from the rare earth elements (including yttrium). Preferably, R includes substantially no La or Ce. This is because if La or Ce is included, R (typically Nd) included in the $R_2Fe_{14}B$ phase is replaced with La or Ce, thus decreasing the coercivity and deteriorating the loop squareness of the demagnetization curve. However, the magnetic properties will not be affected so seriously if a very small percentage (i.e., about 0.5 at % or less) of La or Ce exists as an inevitably contained impurity. Therefore, the phrase "substantially no La (Ce)" or "substantially excluding La (Ce)" herein means that the content of La (Ce) is about 0.5 at % or less. More specifically, R preferably includes Pr or Nd as an indispensable element, a portion of which may be replaced with Dy and/or Tb. If the mole fraction y of R is less than about 6 at %, then fine grains with the nanocrystalline $R_2Fe_{14}B$ structure, which is needed for realizing the coercivity, do not crystallize sufficiently and the desired high coercivity $H_{cJ}$ of about 480 kA/m or more cannot be obtained. On the other hand, if the mole fraction y of R is equal to or greater than about 10 at %, then the percentage of the iron-based borides with ferromagnetic properties and α-Fe phase decreases but that of the R-rich non-magnetic phases increases instead. As a result, the intended nanocomposite structure cannot be formed and the magnetization drops. For these reasons, the mole fraction y of the rare earth element R is preferably equal to or greater than about 6 at % but less than about 10 at % (e.g., from about 7 at % to about 9.5 at %), more preferably from about 7.5 at % to about 9.3 at %, and even more preferably from about 8.0 at % to about 9.0 at %. Although the mole fraction y of the rare earth element R is low in the preferred embodiments of the present invention, the additive Ti enables the $R_2Fe_{14}B$ phase to nucleate and grow faster and earlier than any other phase. Accordingly, R included in the molten alloy can be used effectively to produce the $R_2Fe_{14}B$ phase and the concentration of R will be low in the grain boundary portion of the $R_2Fe_{14}B$ phase. As a result, the concentration of R in the grain boundary phase becomes about 0.5 at % or less, which is much lower than the R concentration of about 11 at % in the hard magnetic phase. In this manner, R can be used effectively to form the hard magnetic phase (e.g., the $R_2Fe_{14}B$ phase) in the preferred embodiments of the present invention. Therefore, even though the R mole fraction y is less than about 10 at % and the hard magnetic phase (e.g., the $R_2Fe_{14}B$ phase) accounts for about 65 at % to about 85 at % of the entire alloy, that hard magnetic phase still can be coupled magnetically with the soft magnetic phase existing in the grain boundary through exchange interaction. As a result, excellent hard magnetic properties are achieved. It should be noted that the volume percentage of each constituent phase such as the $R_2Fe_{14}B$ phase is herein measured by Mössbauer spectroscopy.

To achieve the effects described above, Ti is indispensable. The additive Ti increases the coercivity $H_{cJ}$, remanence $B_r$ and maximum energy product $(BH)_{max}$ and improves the loop squareness of the demagnetization curve.

If the mole fraction z of Ti is less than about 0.5 at %, then those effects expected from the additive Ti cannot be achieved fully. Nevertheless, if the mole fraction z of Ti exceeds about 6 at %, then the volume percentage of the non-magnetic phases, remaining in the alloy even after the alloy has been heated and crystallized, increases and the remanence $B_r$ likely drops. Also, if the mole fraction z of Ti exceeds about 6 at %, $TiB_2$ is produced in the molten alloy, thus making it difficult to carry out the melt quenching process as intended. In view of these considerations, the mole fraction z of Ti is preferably from about 0.5 at % to about 6 at %. The lower limit of a more preferable z range is about 1.0 at % and the upper limit thereof is about 5 at %. The upper limit of an even more preferable z range is about 4 at %.

Also, the higher the mole fraction x of Q, the more likely the amorphous phases, including an excessive percentage of Q (e.g., boron), are formed. Accordingly, the mole fraction z of Ti is preferably set higher because of this reason also. Ti has a strong affinity for B and is condensed in the film-like grain boundary phase. However, if the ratio of the mole fraction z of Ti to the mole fraction x of B is too high, then Ti will not be present in the $Fe_3B$ grain boundary phase anymore but will be incorporated into the $R_2Fe_{14}B$ compound, thus possibly decreasing the magnetization. Nevertheless, if the z/x ratio is too low, then non-magnetic B-rich amorphous phases will be produced profusely. The present inventors discovered and confirmed via experiments that the mole fractions x and z are preferably controlled to satisfy the inequality of $0.05 \leq z/x \leq 0.4$, more preferably to satisfy the inequality of $0.1 \leq z/x \leq 0.35$ and even more preferably to satisfy the inequality of $0.13 \leq z/x - \leq 0.3$.

The balance of the material alloy, other than the elements B, C, R and Ti, may be Fe alone. Alternatively, at least one transition metal element T selected from the group consisting of Co and Ni may be substituted for a portion of Fe, because the desired hard magnetic properties are achievable in that case also. However, if more than about 50% of Fe is replaced with T, then a high remanence $B_r$ of about 0.7 T or more cannot be obtained. For that reason, the percentage of Fe replaced preferably ranges from about 0% to about 50%. Also, by substituting Co for a portion of Fe, the loop squareness of the demagnetization curve improves and the Curie temperature of the $R_2Fe_{14}B$ phase increases, thus increasing the thermal resistance of the alloy. The percentage of Fe replaceable with Co is preferably from about 0.5% to about 40%.

To achieve various desired advantages and effects, metal element(s) M may be added at a mole fraction of about 0 at % to about 10 at %. M is at least one element selected from the group consisting of Al, Si, V, Cr, Mn, Cu, Zn, Ga, Zr, Nb, Mo, Hf, Ta, W, Pt, Pb, Au and Ag.

Hereinafter, specific preferred embodiments of the present invention will be described with reference to the accompanying drawings.

Melt Quenching Machine

Figure 2A:
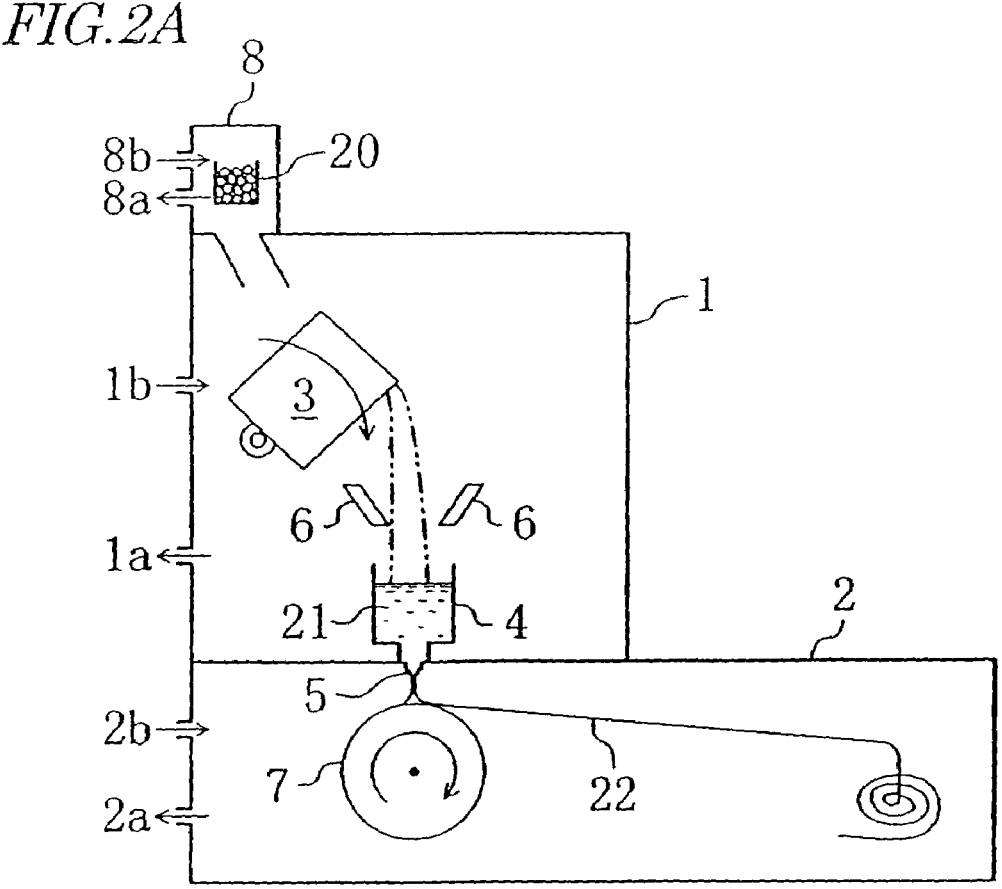
FIG. 2A is a cross-sectional view illustrating an overall arrangement for a melt quenching machine for use to make a rapidly solidified alloy for the iron-based rare earth alloy magnet according to preferred embodiments of the present invention.
Figure 2B:
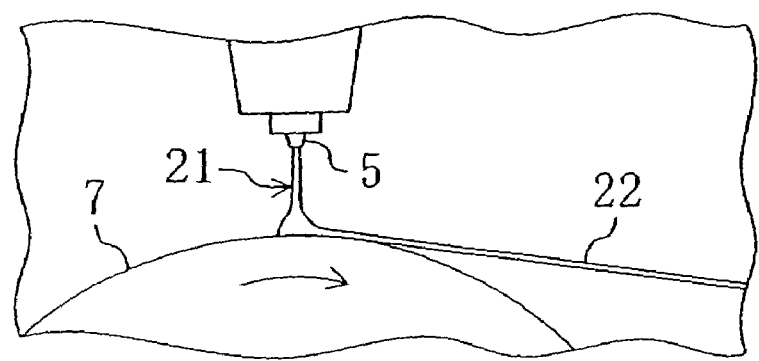
FIG. 2B illustrates part of the machine shown in FIG. 2A, where a melt is quenched and rapidly solidified, to a larger scale.

In this preferred embodiment, a material alloy is prepared using a melt quenching machine such as that shown in FIGS. 2A and 2B. The alloy preparation process is performed within an inert atmosphere to prevent the material alloy, which includes rare earth element R and Fe that are easily oxidizable, from being oxidized. The inert gas may be either a rare gas of helium or argon, for example, or nitrogen. A rare gas of helium or argon is preferred to nitrogen, because nitrogen reacts with the rare earth element R relatively easily.

The machine shown in FIG. 2A includes a material alloy melting chamber 1 and a material alloy quenching chamber 2, in which a vacuum or an inert atmosphere is created at an adjustable pressure. Specifically, FIG. 2A illustrates an overall arrangement of the machine, while FIG. 2B illustrates a portion of the machine to a larger scale.

As shown in FIG. 2A, the melting chamber 1 includes a melting crucible 3, a melt reservoir 4 with a teeming nozzle 5 at the bottom and an airtight mixed material feeder 8. A material alloy 20, which has been prepared to have a desired magnet alloy composition and supplied from the feeder 8, is melted in the melting crucible 3 at an elevated temperature. A melt 21 of the material alloy 20 is poured into the reservoir 4, which is provided with a heater (not shown) for holding the temperature of the melt 21 teemed therefrom at a predetermined level.

The quenching chamber 2 includes a rotating chill roller 7 for rapidly cooling and solidifying the melt 21 that has been poured through the teeming nozzle 5.

In this machine, the atmosphere and pressure inside the melting and quenching chambers 1 and 2 are controlled to prescribed ranges. For that purpose, atmospheric gas inlet ports 1b, 2b and 8b and outlet ports 1a, 2a and 8a are provided at appropriate positions of the machine. In particular, the gas outlet port 2a is connected to a pump to control the absolute pressure inside the quenching chamber 2 within a range from about 30 kPa to around the atmospheric pressure.

The melting crucible 3 may be tilted to a desired angle to pour the melt 21 through a funnel 6 into the reservoir 4. The melt 21 in the reservoir 4 is heated by the heater (not shown).

The teeming nozzle 5 of the reservoir 4 is positioned on the boundary wall between the melting and quenching chambers 1 and 2 to pour the melt 21 from the reservoir 4 onto the surface of the chill roller 7, which is located under the nozzle 5. The orifice diameter of the nozzle 5 may be from about 0.5 mm to about 2.0 mm, for example. If the viscosity of the melt 21 is high, then the melt 21 cannot flow through the nozzle 5 easily. In this preferred embodiment, however, the pressure inside the quenching chamber 2 is kept lower than the pressure inside the melting chamber 1. Accordingly, there exists an appropriate pressure difference between the melting and quenching chambers 1 and 2, and the melt 21 can be teemed smoothly.

To achieve a good thermal conductivity, the chill roller 7 may be made of Al alloy, Cu alloy, carbon steel, brass, W, Mo or bronze, or other suitable material. However, the roller 7 is preferably made of Cu, because Cu realizes a sufficient mechanical strength at a reasonable cost. The diameter of the roller 7 may be about 300 mm to about 500 mm, for instance. The water-cooling capability of a water cooler provided inside the roller 7 is calculated and controlled based on the latent heat of solidification and the volume of the melt teemed per unit time.

The machine shown in FIGS. 2A and 2B can rapidly solidify about 10 kg of material alloy in about 10 to about 20 minutes, for example. The rapidly solidified alloy obtained in this manner is in the form of a thin strip (or alloy ribbon) 22 with a thickness of about 10 μm to about 300 μm and a width of about 2 mm to about 3 mm.

Melt Quenching Process

First, the melt 21 of the material alloy, which is represented by the general formula described above, is prepared and stored in the reservoir 4 of the melting chamber 1 shown in FIG. 2A. Next, the melt 21 is poured through the teeming nozzle 5 onto the water-cooled chill roller 7 to come into contact with, and be rapidly cooled and solidified by, the roller 7 within a reduced-pressure Ar atmosphere. In this case, an appropriate rapid solidification technique that makes the cooling rate controllable precisely needs to be adopted.

In this preferred embodiment, the resultant magnet can easily have its desired microstructure by nucleating the $R_2T_{14}Q$ type phase as a hard magnetic phase in a high-temperature range where crystal nuclei are created very often while the molten alloy is being cooled. Accordingly, the $R_2T_{14}Q$ type phase can be included at about 60 vol % or more in the as-cast (i.e., yet to be annealed) rapidly solidified alloy. To obtain such a structure, the molten alloy is preferably quenched at a rate of about $1 \times 10^{2°}$ C./sec to about $1 \times 10^{8°}$ C./sec, more preferably about $1 \times 10^{2°}$ C./sec to about $1 \times 10^{6°}$ C./sec.

An interval during which the molten alloy 21 is quenched by the chill roller 7 is equivalent to a period of time from when the molten alloy 21 reaches the circumference of the rotating chill roller 7 and when the quenched alloy 22 leaves the roller 7. In the meantime, the alloy has its temperature decreased to become a supercooled liquid. Thereafter, the supercooled alloy leaves the roller 7 and travels within the inert atmosphere. While the thin-strip alloy is traveling, the alloy has its heat dissipated into the atmospheric gas. As a result, the temperature of the alloy further drops. According to this example of preferred embodiments of the present invention, the pressure of the atmospheric gas is controlled to a range of about 30 kPa to around the atmospheric pressure. Thus, the heat of the alloy can be dissipated into the atmospheric gas even more effectively, and the $R_2T_{14}Q$ type phase such as an $Nd_2Fe_{14}B$ phase can be nucleated and grown finely and uniformly in the alloy. It should be noted that unless an appropriate amount of Ti has been added to the material alloy, α-Fe phase nucleates and grows faster and earlier in the rapidly solidified alloy, thus deteriorating the resultant magnet properties.

In this preferred embodiment, the surface velocity of the roller 7 is adjusted to a range of about 10 m/sec to about 30 m/sec and the pressure of the atmospheric gas is preferably equal to about 30 kPa or more to increase the secondary cooling effects caused by the atmospheric gas. In this manner, a rapidly solidified alloy, including about 60 vol % or more of $R_2T_{14}Q$ type phase with an average grain size of as small as about 50 nm or less, is prepared.

According to various preferred embodiments of the present invention, the technique of rapidly cooling the melt is not limited to the single roller melt-spinning method described above. Examples of other applicable techniques include twin roller method, gas atomization method, strip casting method that requires no flow rate control using nozzle or orifice, and rapid cooling technique utilizing the roller and atomization methods in combination.

Among these rapid cooling techniques, the strip casting method results in a relatively low cooling rate of about $10^{2°}$ C./sec to about $10^{5°}$ C./sec. According to this preferred embodiment, by adding an appropriate volume of Ti to the material alloy, a rapidly solidified alloy, most of which has a structure including no Fe initial crystals, can be obtained even by the strip casting method. The process cost of the strip casting method can be about half or less of any other rapid cooling method. Accordingly, when preparing a large quantity of rapidly solidified alloy, the strip casting method is much more effective than the single roller method, and is suitably applicable for use in mass production. However, if no Ti is added to the material alloy or if Mn, Mo, Ta and/or W are/is added thereto instead of Ti, then a metal structure including a lot of Fe initial crystals will be produced even in the rapidly solidified alloy prepared by the strip casting method. Consequently, the desired microstructure cannot be obtained.

Heat Treatment

In this preferred embodiment, heat treatment (annealing) is conducted within an argon atmosphere. Preferably, the alloy is heated at a temperature increase rate of about 5° C./sec to about 20° C./sec, held at a temperature of about 550° C. to about 850° C. for a period of time from about 30 seconds to about 20 minutes and then cooled to around room temperature. This heat treatment results in nucleation and/or crystal growth of metastable phases in a remaining amorphous phase, thus forming a nanocomposite nanocrystalline structure. According to the preferred embodiment of the present invention, the nanocrystalline $R_2Fe_{14}B$ phase (e.g., $Nd_2Fe_{14}B$ phase) already accounts for about 60 volume % or more of the as-cast rapidly solidified alloy yet to be annealed. Thus, when the heat treatment is conducted under the conditions specified above, soft magnetic phases other than the nanocrystalline $Nd_2Fe_{14}B$ phase (such as a α-Fe phase and other crystalline phases) will not increase their sizes too much and will be distributed finely and uniformly in the grain boundary between the nanocrystalline $Nd_2Fe_{14}B$ grains. When the heat treatment is finished, the nanocrystalline $R_2Fe_{14}B$ (e.g., $Nd_2Fe_{14}B$) phase will account for about 65 vol % to about 85 vol % of the annealed alloy.

If the heat treatment temperature is lower than about 550° C., then a lot of amorphous phases may remain even after the heat treatment and the resultant coercivity may not reach the desired level depending on the conditions of the rapid cooling process. On the other hand, if the heat treatment temperature exceeds about 850° C., the grain growth of the respective constituent phases may advance too much, thus decreasing the remanence $B_r$ and deteriorating the loop squareness of the demagnetization curve. For these reasons, the heat treatment temperature is preferably about 550° C. to about 850° C., more preferably about 570° C. to about 820° C.

In this preferred embodiment of the present invention, a sufficient amount of $Nd_2Fe_{14}B$ phase has crystallized uniformly and finely in the rapidly solidified alloy. Accordingly, even if the rapidly solidified alloy is not annealed, the solidified alloy itself can exhibit good enough magnet properties. That is to say, the heat treatment for crystallization is not indispensable for the present invention. However, to further improve the magnet properties, the heat treatment is preferably conducted. In addition, even though the heat treatment is carried out at lower temperatures than the conventional process, the magnet properties still can be improved sufficiently.

To prevent the alloy from being oxidized, the heat treatment is preferably conducted within an inert gas (e.g., Ar or $N_2$ gas) atmosphere having a pressure of about 50 kPa or less. Alternatively, the heat treatment may also be carried out in a vacuum of about 1.0 kPa or less.

Before the heat treatment, the rapidly solidified alloy may include metastable phases such as $Fe_3B$, $Fe_{23}B_6$ and $R_2Fe_{23}B_3$ phases in addition to the $R_2Fe_{14}B$ and amorphous phases. In that case, when the heat treatment is finished, the $R_2Fe_{23}B_3$ phase will have disappeared. Instead, crystal grains of an iron-based boride (e.g., $Fe_{23}B_6$), showing a saturation magnetization approximately equal to, or even higher than, that of the $R_2Fe_{14}B$ phase, or α-Fe phase can be grown.

The resultant magnet alloy that has gone through this heat treatment includes an $R_2T_{14}Q$ type phase (e.g., $R_2Fe_{14}B$ phase) at about 65 vol % to about 85 vol %. More specifically, if the mole fraction y of R is about 9 at %, then the $R_2T_{14}Q$ type phase is about 75 vol % of the entire alloy. But if the mole fraction y of R is decreased to about 8 at %, then the $R_2T_{14}Q$ type phase accounts for about 68 vol % of the entire alloy. On the other hand, the magnet also includes soft magnetic phases at about 10 vol % to about 35 vol %.

Also, the crystalline phases, including the $R_2T_{14}Q$ type compound and the ferromagnetic iron-based boride, account for about 95 vol % or more in total, while the amorphous phases account for about 5 vol % or less of the entire alloy.

In the preferred embodiments of the present invention, even if the soft magnetic phases such as the iron-based boride remain in the resultant annealed alloy, those soft magnetic phases are present in the shape of a thin film that covers the hard magnetic phases. Accordingly, excellent magnetic properties are still achievable because the soft and hard magnetic phases are magnetically coupled together through exchange interaction.

According to the preferred embodiments of the present invention, the grain boundary phases are mostly made of an iron-based boride (e.g., $Fe_3B$) with ferromagnetic properties and also include the α-Fe phase with ferromagnetic properties and other additional phases. More specifically, the iron-based boride accounts for about 70 vol % or more of the grain boundary phases. However, almost no rare earth elements R such as Nd are present in the grain boundary phases. Instead, the rare earth elements R are effectively used for producing the hard magnetic phase. A nanocrystalline structure like this cannot be obtained unless an appropriate amount of Ti is added to a composition having an R mole fraction y of less than about 10 at % and a Q mole fraction x of greater than about 10 at %. Stated otherwise, if any other metal element were added instead of Ti, the resultant grain boundary phases, if any, would be amorphous phases with low magnetization. Thus, it would be difficult to make a nanocomposite magnet with good properties from such an alloy. Also, even if Ti is added to a material alloy having a Q mole fraction x of about 10 at % or less, no soft magnetic phases with high magnetization will be formed in the grain boundary. Thus, the resultant magnet cannot be a nanocomposite magnet that exhibits excellent magnet properties through the exchange coupling of its composite phases.

After the heat treatment, the $R_2T_{14}Q$ type phase needs to have an average crystal grain size of about 300 nm or less, which is a single magnetic domain size. The average grain size of the $R_2T_{14}Q$ type phase is preferably about 20 nm to about 200 nm, more preferably about 20 nm to about 100 nm.

On the other hand, if the thin film of the iron-based boride has an average thickness of greater than about 50 nm, then the exchange interaction among the respective constituent phases weakens, thus deteriorating the loop squareness of the demagnetization curve and decreasing $(BH)_{max}$. This is why the average size of the iron-based boride phase (i.e., the average thickness of the film) as measured in the thickness direction of the grain boundary is preferably about 50 nm or less, more preferably about 30 nm or less and even more preferably about 20 nm or less.

It should be noted that the thin strip of the rapidly solidified alloy may be coarsely cut or pulverized before being subjected to the heat treatment. After the heat treatment, the resultant magnetic alloy is finely pulverized to obtain a magnet powder. Then, various types of bonded magnets can be made from this magnet powder by performing known process steps on the powder. In making a bonded magnet, the magnet powder of the iron-based rare earth alloy is compounded with an epoxy or nylon resin binder and then molded into a desired shape. At this time, a magnet powder of any other type (e.g., an Sm—Fe—N type magnet powder or hard ferrite magnet powder) may be mixed with the nanocomposite magnet powder.

Using the resin-resultant bonded magnet, motors, actuators and other rotating machines can be produced.

When the magnet powder according to this preferred embodiment of the present invention is used for an injection-molded bonded magnet, the magnet powder is preferably pulverized to have a mean particle size of about 200 μm or less, more preferably about 30 μm to about 150 μm. On the other hand, if this magnet powder is used for a compacted bonded magnet, the magnet powder is preferably pulverized to have a mean particle size of about 300 μm or less, more preferably about 30 μm to about 250 μm and even more preferably about 50 μm to about 200 μm with a bimodal size distribution.

It should be noted that if the magnet powder obtained in this manner is subjected to a surface treatment (e.g., coupling treatment, conversion coating or plating), then the powder for a bonded magnet can have its moldability improved no matter how the powder is molded. In addition, the resultant bonded magnet can have increased anticorrosiveness and thermal resistance. Alternatively, after a bonded magnet has been once formed by molding the magnet powder into a desired shape, the surface of the magnet may also be treated, e.g., covered with a plastic or conversion coating or plated. This is because the anticorrosiveness and thermal resistance of the bonded magnet can also be increased as in the situation where the magnet powder is subjected to the surface treatment.

EXAMPLES

Example 1

The respective materials B, Fe, Ti and Nd with purities of about 99.5% or more were weighed so as to have an alloy composition represented by $Nd_9Fe_{78.7}B_{10.3}Ti_2$ (where the subscripts are indicated in atomic percentages) and a total weight of about 30 g. Then, the mixture was injected into a crucible of quartz.

The quartz crucible had an orifice with a diameter of about 0.8 mm at the bottom. Accordingly, the alloy including these materials was melted in the quartz crucible so as to be a melt of the material alloy, which was then poured down through the orifice. The material alloy was melted by an induction heating method within an argon atmosphere at a pressure of about 35 kPa. In this specific example of preferred embodiments of the present invention, the temperature of the melt was about 1500° C.

The surface of the melt was pressurized with Ar gas at about 26.7 kPa, thereby ejecting the melt against the outer circumference of a copper chill roller, which was located about 0.7 mm under the orifice. The roller was rotated at a high velocity while being cooled inside so that the outer circumference temperature thereof would be held around room temperature. Accordingly, the melt, which had been poured down through the orifice, came into contact with the surface of the chill roller to have its heat dissipated therefrom while being forced to rapidly move on the rotating chill roller. The melt was continuously expelled through the orifice onto the surface of the roller. Thus, the rapidly solidified alloy was in the shape of an elongated thin strip (or ribbon) with a width of about 2 mm to about 3 mm and a thickness of about 20 μm to about 50 μm.

In the (single) roller method adopted in this example, the cooling rate is determined by the circumference velocity of the roller and the weight of the melt poured per unit time, which depends on the diameter (or cross-sectional area) of the orifice and the pressure on the melt. In the present example, the feeding rate was about 0.5 kg/min to about 1 kg/min and the roller surface velocity was about 20 m/sec.

The rapidly solidified alloy structure that had been obtained by this rapid cooling process was analyzed by a CuKα characteristic X-ray. As a result, diffraction peaks representing $Nd_2Fe_{14}B$ phase were barely recognizable in the halo pattern. Thus, the present inventors confirmed that a nanocrystalline $Nd_2Fe_{14}B$ phase was present in the amorphous phases of the rapidly solidified alloy.

Next, this rapidly solidified alloy was annealed within an argon gas. Specifically, the rapidly solidified alloy was held at about 660° C. for about 10 minutes and then cooled to room temperature. Thereafter, the magnetic properties of the annealed alloy were measured with a vibrating sample magnetometer (VSM). The results are shown in the following Table 1:

TABLE 1

| Composition (in atomic percentages) | Magnetic properties | | |
|---|---|---|---|
| | $B_r$ (T) | $H_{cJ}$ (kA/m) | $(BH)_{max}$ (kJ/m$^3$) |
| $Nd_9Fe_{78.7}B_{10.3}Ti_2$ | 0.88 | 722.57 | 121.0 |

Figure 3:
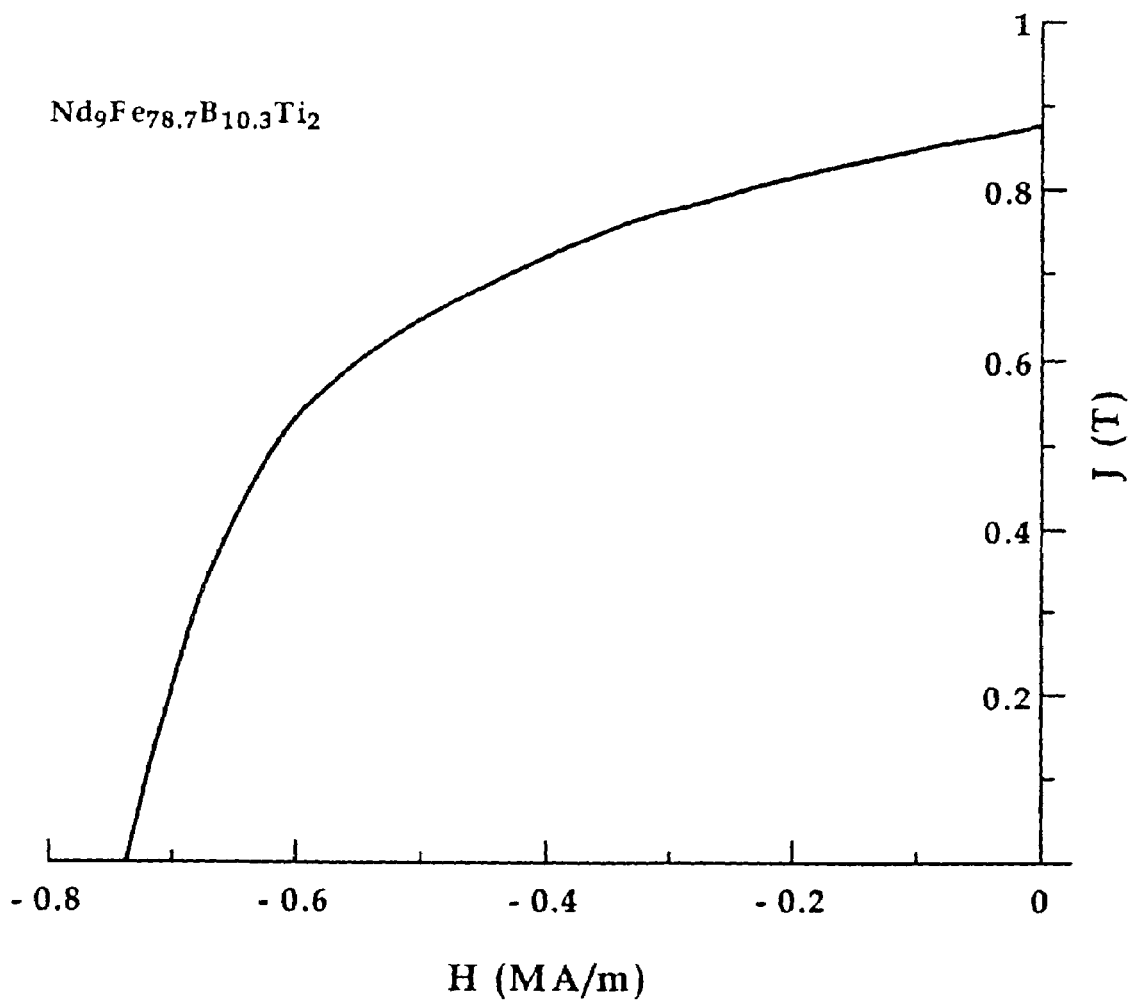
FIG. 3 is a graph showing the demagnetization curve of a sample representing an example of preferred embodiments of the present invention.

FIG. 3 shows the demagnetization curve of this sample.

Figure 4:
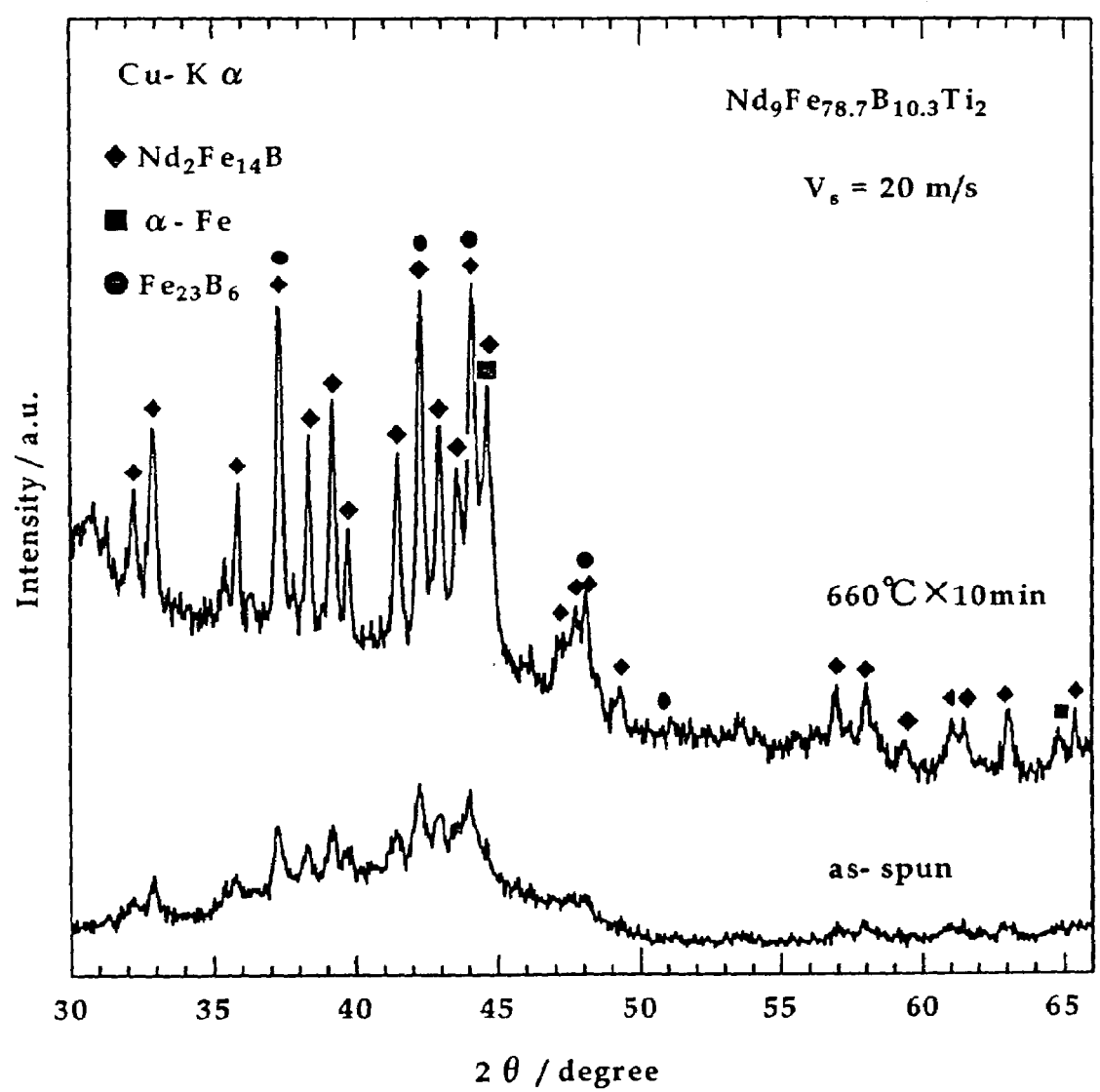
FIG. 4 is a graph showing the X-ray diffraction patterns of the sample that has been annealed.

When the annealed alloy structure was analyzed by a CuKα characteristic X-ray, the halo pattern had disappeared but diffraction peaks representing $Nd_2Fe_{14}B$, $Fe_{23}B_6$ and α-Fe phases were observed. FIG. 4 shows the powder X-ray diffraction patterns of the annealed alloy.

Figure 5:
FIG. 5 is a photograph that was taken of an example of preferred embodiments of the present invention at a power of about 125,000 by observing the micro metal structure of the annealed sample with a transmission electron microscope.

Next, the annealed micro metal structure was analyzed with a transmission electron microscope (TEM). As a result, crystal grains with an average grain size of about 150 nm and fine crystal grains with an average grain size of about 20 nm were observed. The fine crystal grains were present in the grain boundary between the former crystal grains. FIG. 5 is a TEM photograph showing a dark-field image of the annealed alloy at a power of about 125,000.

Next, the alloy compositions of the crystal grains that had been observed with the TEM were analyzed by a TEM-EDX. As a result, the crystal grains with the average grain size of about 150 nm were identified as $Nd_2Fe_{14}B$. However, the phase of the fine crystal grains with the average grain size of about 20 nm, existing in the grain boundary between the $Nd_2Fe_{14}B$ crystal grains, was not identifiable. Thus, it can be seen that the iron-based boride was either dispersed as very small particles in the grain boundary or present in the form of a thin film (or layer).

Next, the annealed alloy was polished mechanically and processed into a prismatic rod-like sample. Furthermore, the end of this rod-like sample was sharpened into a needle shape by an electrolytic polishing technique. Then, the metal structure of this needle-like sample was analyzed with an atom probe field-ion microscope (APFIM). As a result, the present inventors identified not only an $Nd_2Fe_{14}B$ phase as main phase but also an iron-based boride and a very small amount of Fe. The present inventors also discovered that the concentration of Ti in the iron-based boride was about three times as high as that of Ti in the $Nd_2Fe_{14}B$ phase.

Figure 6:
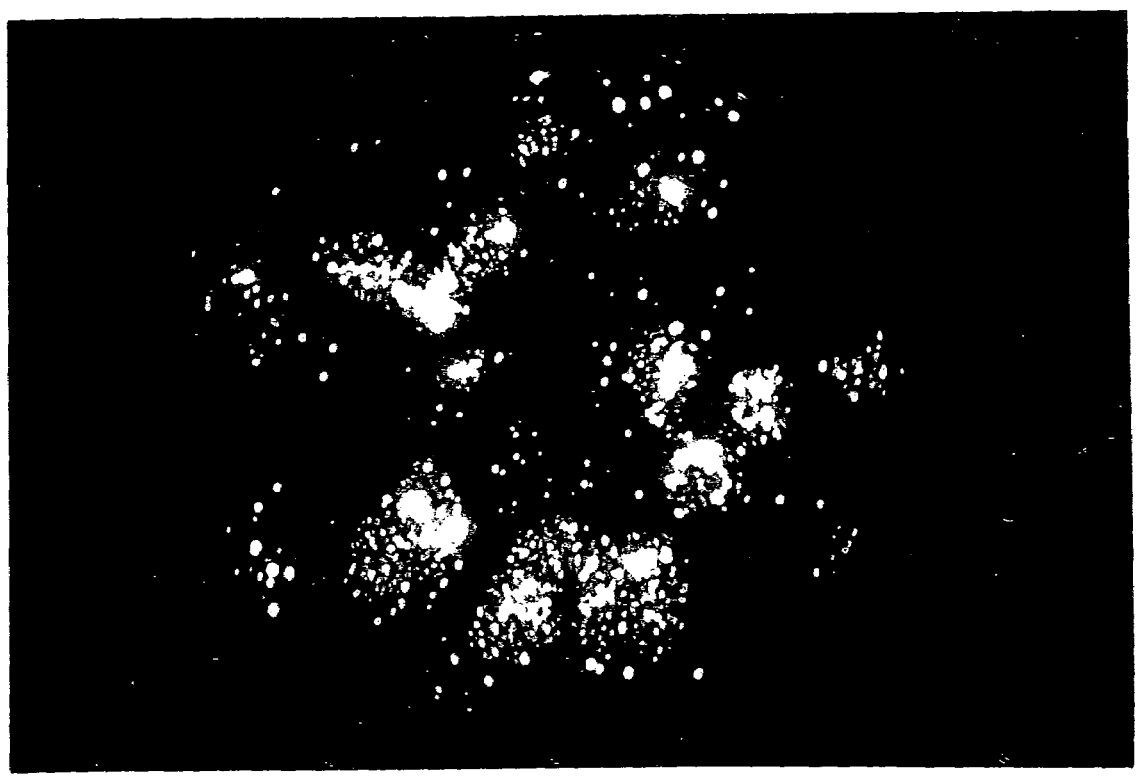
FIG. 6 is a photograph showing an FIM image that was taken of the example of preferred embodiments of the present invention by observing the metal structure of a needle-like sample with an atom probe field-ion microscope (APFIM).

The cumulative numbers of ions counted by the APFIM analysis were plotted. When the total number of ions plotted reached about 12,700, the APFIM analysis was stopped to take an FIM image of the end of the needle-like sample. FIG. 6 shows this FIM image.

The center of the image shown in FIG. 6 corresponds to a probe hole. The FIM image obtained shows that bright island-like regions are dispersed in the dark region. Considering the conditions under which this image was taken, the dark matrix may be regarded as representing the $Nd_2Fe_{14}B$ phase while the bright island-like regions may be regarded as representing the iron-based boride phase. That is to say, it can be seen that the boride phase was finely dispersed in the annealed alloy. However, the composition of the iron-based boride phase of the very small size was not analyzable with the TEM.

To detect the three-dimensional distribution of the iron-based boride more accurately, a number of FIM images of the needle-like sample need to be taken successively at relatively short intervals in the depth direction thereof. Then, the FIM images obtained need to be processed so as to be arranged in the depth direction.

The TEM and FIM images both showed that the iron-based boride phase had a cross-sectional size of about 10 nm. Accordingly, if the iron-based boride had been present inside the $Nd_2Fe_{14}B$ crystal grains, then its phase should have been identified with the TEM. However, no such phases were identifiable according to the results of experiments conducted by the present inventors. These results showed that the iron-based boride was not present inside the $Nd_2Fe_{14}B$ crystal grains but either finely dispersed in the grain boundary between the $Nd_2Fe_{14}B$ crystal grains or present in the form of a partially continuous film covering the $Nd_2Fe_{14}B$ crystal grains.

If the iron-based boride in the shape of such a porous film is observed as a TEM or FIM image, then the iron-based boride will be observed as mutually separated, fine crystal grains having a size of about 1 nm to about 20 nm on an arbitrary cross section of the $Nd_2Fe_{14}B$ crystal grains and the iron-based boride.

In the preferred embodiments of the present invention, while the molten alloy is being rapidly solidified, the $R_2Fe_{14}B$ phase crystallizes first, and the iron-based boride phase crystallizes next. Accordingly, the present inventors believe that the iron-based boride phase will nucleate and grow from the surface of $R_2Fe_{14}B$ crystal grains, which are dispersed in the amorphous matrix, as its non-uniform nuclei. The present inventors also believe that the iron-based boride phase, which has nucleated on the surface of the $R_2Fe_{14}B$ crystal grains, would grow in such a manner as to cover the surface of the $R_2Fe_{14}B$ crystal grains to prevent increase in interface energy. As a result, portions of the iron-based boride phase would be combined together to form a film that covers the $R_2Fe_{14}B$ crystal grains at least partially.

In this manner, preferred embodiments of the present invention provide a novel nanocomposite magnet structure in which $R_2Fe_{14}B$ crystal grains with hard magnetic properties are covered with a film of an iron-based boride with soft magnetic properties. The present inventors believe that this magnet exhibits excellent magnetic properties due to this unique structure.

Example 2

For each of samples Nos. 1 to 8 shown in the following Table 2, the respective materials B, C, Fe, Ti, V, Cr and Nd with purities of about 99.5% or more were weighed so that each sample had a total weight of about 30 g. Then, the mixture was injected into a crucible of quartz. In Table 2, "bal", means the balance.

TABLE 2

| | | Alloy composition (at %) | Heat Treatment Temperature (° C.) | $B_r$ (T) | $H_{cJ}$ (kA/m) | $(BH)_{max}$ (kJ/m$^3$) |
|---|---|---|---|---|---|---|
| E | 1 | $Nd_{8.5}Fe_{bal}B_{12}C_2Ti_4$ | 740 | 0.80 | 1018.7 | 105.5 |
| X | 2 | $Nd_9Fe_{bal}B_{11}Ti_2$ | 720 | 0.87 | 730.2 | 119.4 |
| A | 3 | $Nd_{8.5}Fe_{bal}B_{11}C_1Ti_{2.5}$ | 700 | 0.90 | 923.2 | 124.6 |
| M | 4 | $Nd_{8.2}Fe_{bal}B_{12}C_1Ti_3$ | 720 | 0.87 | 843.8 | 113.1 |
| P | 5 | $Nd_{8.8}Fe_{bal}B_{12.4}C_{1.6}Ti_4Nb_1$ | 720 | 0.81 | 1012.4 | 104.6 |
| C | 6 | $Nd_9Fe_{bal}B_{11}Cr_2$ | 720 | 0.72 | 713.6 | 87.9 |
| O | 7 | $Nd_{8.1}Fe_{bal}B_{11}C_1V_7$ | 780 | 0.63 | 1003.5 | 77.4 |
| M | 8 | $Nd_{7.7}Fe_{bal}B_{14}Cr_6$ | 770 | 0.59 | 1036.8 | 63.0 |

The quartz crucible had an orifice with a diameter of about 0.8 mm at the bottom. Accordingly, the alloy including these materials was melted in the quartz crucible so as to be a melt of the alloy, which was then poured down through the orifice. The material alloy was melted by an induction heating method within an argon atmosphere. In this second specific example, the temperature of the melt was set to about 1400° C.

The surface of the melt was pressurized with Ar gas at about 30 kPa, thereby ejecting the melt against the outer circumference of a copper chill roller, which was located under the orifice. In the present example, the feeding rate was about 0.4 kg/min and the roller surface velocity was about 20 m/sec. In this manner, a thin-strip rapidly solidified alloy with a width of about 1.0 mm and a thickness of about 50 μm was obtained.

This rapidly solidified alloy structure was analyzed by a powder XRD analysis. As a result, the present inventors confirmed that the rapidly solidified alloy was made up of amorphous phases.

Next, the rapidly solidified alloy was cut to a length of about 20 mm and then annealed in Ar gas. This annealing process was conducted by holding each sample at the temperature shown in Table 2 for about 10 minutes.

The annealed alloy structure was subjected to a powder XRD analysis. As a result, diffraction peaks representing $Nd_2Fe_{14}B$, $Fe_3B$ and $Fe_{23}B_6$ phases were observed. Also, when the metal structure of the alloy was analyzed with a transmission electron microscope, it was confirmed that the $Nd_2Fe_{14}B$ and $Fe_3B$ phases coexisted in the alloy. Specifically, the $Nd_2Fe_{14}B$ phase existed as crystal grains with an average grain size of about 50 nm to about 150 nm, while the $Fe_3B$ phase existed in the grain boundary zone of the $Nd_2Fe_{14}B$ phase. The grain boundary zone had a thickness of several nm to about 20 nm.

The magnetic properties of the respective samples were measured with a vibrating sample magnetometer (VSM). The results are also shown in Table 2.

Next, the concentration of Ti in the $Nd_2Fe_{14}B$ phase was measured by an APFIM analysis. Specifically, the annealed rapidly solidified alloy was polished mechanically and processed into a prismatic rod-like sample. Furthermore, the end of this rod-like sample was sharpened into a needle shape by an electrolytic polishing technique. Then, the metal structure of the needle-like sample was analyzed with the APFIM analysis.

Figure 7:
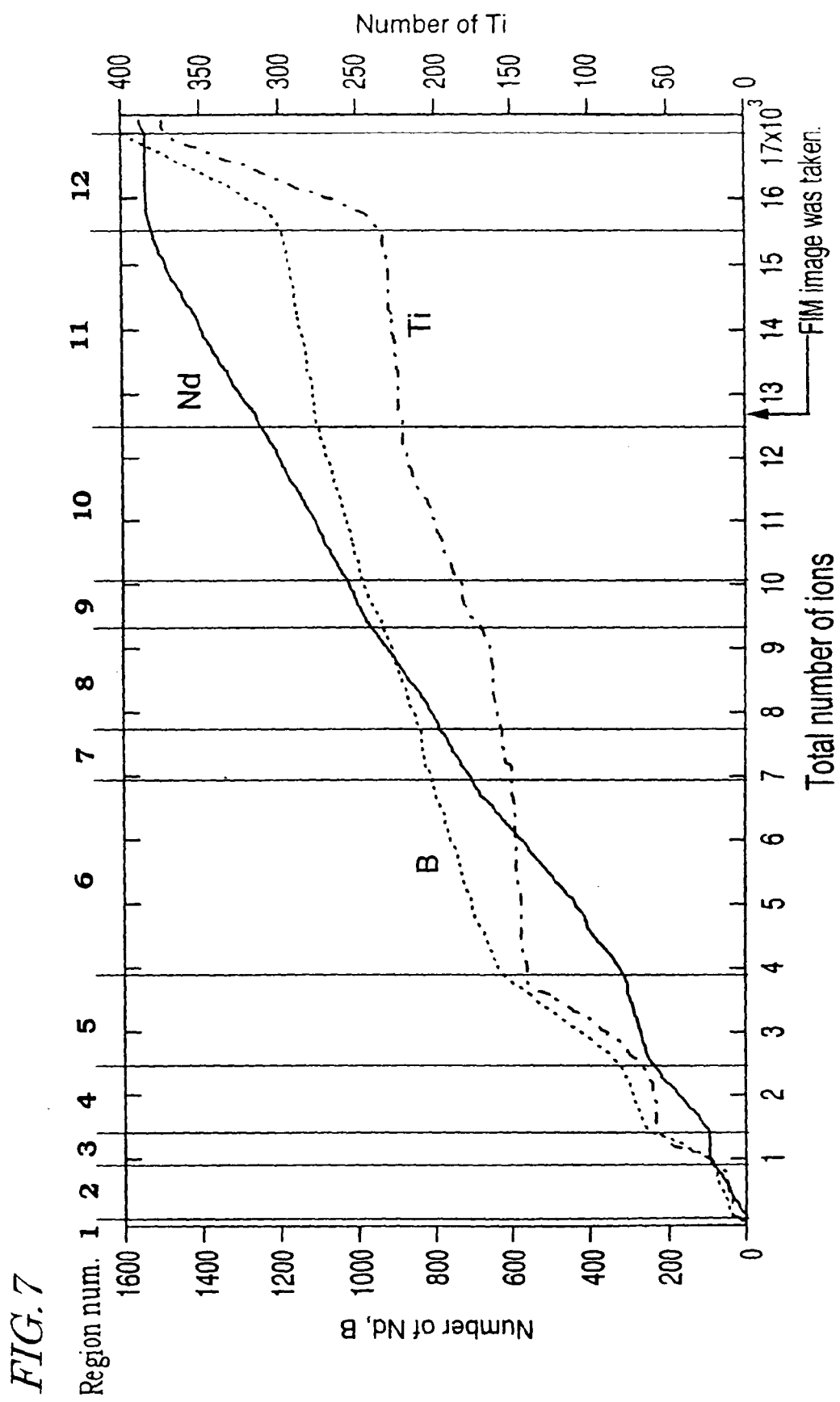
FIG. 7 is a graph showing the cumulative concentration profiles of Nd, B and Ti as measured in the depth direction for sample No. 2.

FIG. 7 shows the cumulative concentration profiles of Nd, B and Ti as measured in the depth direction of sample No. 2. In the graph shown in FIG. 7, the cumulative numbers of ions as counted by the APFIM analysis are plotted in the depth direction. Specifically, a range in which the number of atoms counted increases in the depth direction corresponds to a region where the atoms exist. On the other hand, a range in which the number of atoms counted is constant in the depth direction corresponds to a region where the atoms do not exist.

Figure 8B:
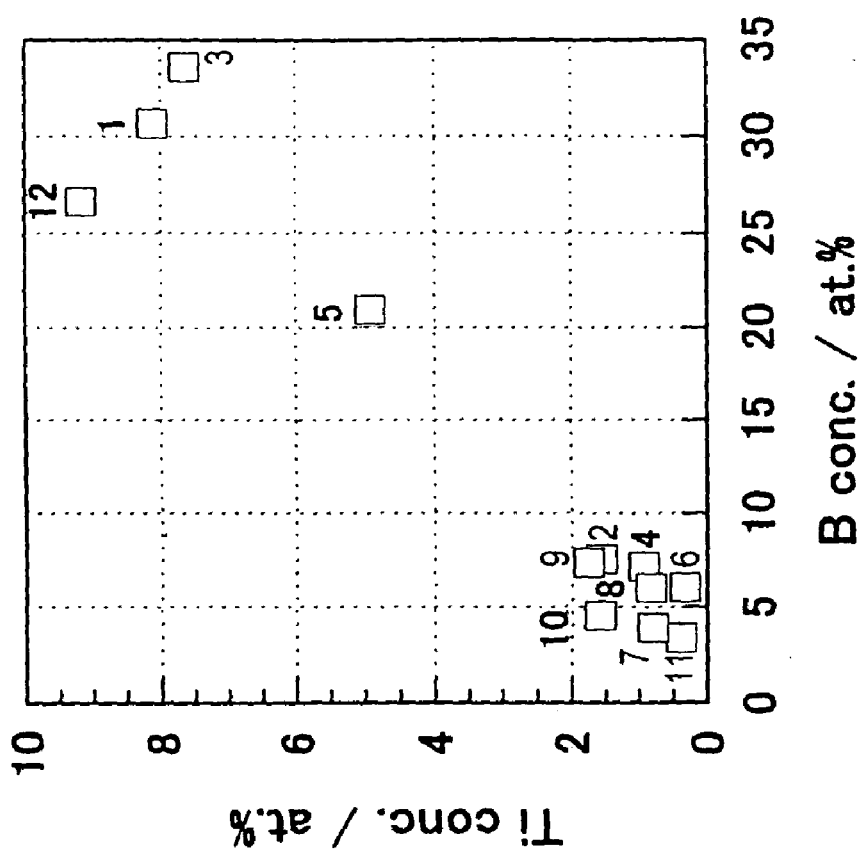
FIG. 8B is a graph showing relationships between the Ti concentrations and the B concentrations in the regions Nos. 1 to 12 shown in FIG. 7.
Figure 8A:
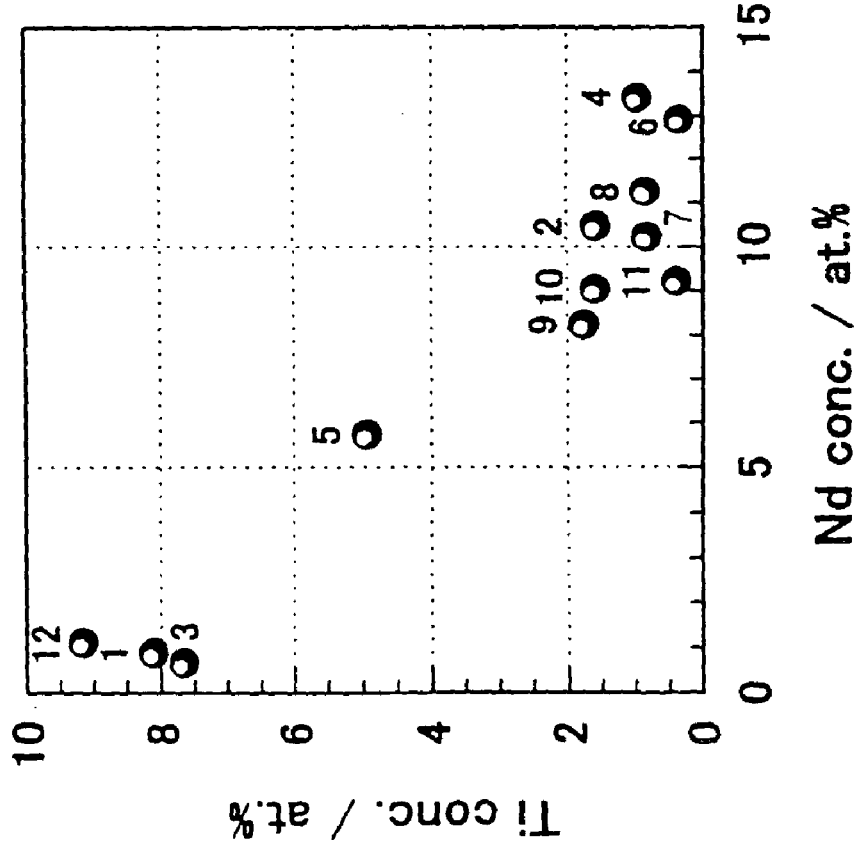
FIG. 8A is a graph showing relationships between the Ti concentrations and the Nd concentrations in the regions Nos. 1 to 12 shown in FIG. 7.

The graph shown in FIG. 7 has a number of nodes at each of which the gradient of the curve representing the count of the Nd, B or Ti ions changes. The range in which the concentrations of Nd, B and Ti were measured was divided into regions Nos. 1 to 12 at these nodes, thereby calculating the concentrations of Nd, B and Ti in these regions Nos. 1 to 12. The results of the calculations are shown in FIGS. 8A and 8B. Specifically, the ordinate of the graph shown in FIG. 8A represents the Ti concentration and the abscissa thereof represents the Nd concentration. On the other hand, the ordinate of the graph shown in FIG. 8B represents the Ti concentration and the abscissa thereof represents the B concentration.

As can be seen from FIG. 8A, in the regions where the Nd concentrations are from about 8 at % to about 14 at %, the Ti concentrations are about 2 at % or less. Since the $Nd_2Fe_{14}B$ phase exists in the regions having the Nd concentrations of about 8 at % to about 14 at %, it can be seen that the concentration of Ti in the $Nd_2Fe_{14}B$ phase is about 2 at % or less.

On the other hand, in the regions where the B concentrations are from about 25 at % to about 35 at %, the Ti concentrations are about 7 at % or more as can be seen from FIG. 8B. Since the iron-based boride exists in the regions having the B concentrations of about 25 at % to about 35 at % (i.e., grain boundary zones), it can be seen that the concentrations of Ti in the grain boundary zones (or grain boundary phases) are about 7 at % or more.

The concentrations of the additive metal(s) M (i.e., Ti, Cr and/or V) as measured by the method described above for the respective samples are shown in the following Table 3:

TABLE 3

|  |  | M concentration (at %) | |
|---|---|---|---|
|  |  | $Nd_2Fe_{14}B$ | Grain boundary Phases |
| EXAMP | 1 | 1.7 | 9.1 |
|  | 2 | 1.6 | 8.3 |
|  | 3 | 1.8 | 8.5 |
|  | 4 | 1.9 | 8.6 |
|  | 5 | 1.8 | 8.9 |
| COM | 6 | 2.7 | 4.2 |
|  | 7 | 4.4 | 5.7 |
|  | 8 | 3.8 | 5.4 |

As can be seen from Table 3, in each of the specific examples of preferred embodiments of the present invention in which Ti was added, the concentration of Ti in the crystal grains of the $Nd_2Fe_{14}B$ type compound was about 2 at % or less. Also, the concentration of Ti in the grain boundary between the $Nd_2Fe_{14}B$ crystal grains was greater than about 8 at %, which is much higher than that of Ti in the $Nd_2Fe_{14}B$ crystal grains themselves. Furthermore, the difference in Ti concentration between the $Nd_2Fe_{14}B$ ($R_2Fe_{14}B$) phase and the grain boundary phases was as much as about 6 at % or more. On the other hand, in each of the comparative examples in which Cr or V was added, the concentration of Cr or V in the $Nd_2Fe_{14}B$ phase was greater than about 2 at %.

If the concentration of the additive M (e.g., Ti) in the $Nd_2Fe_{14}B$ type compound exceeds about 2 at %, then the magnetization of the $Nd_2Fe_{14}B$ crystal grains decreases considerably. To avoid such a decrease in magnetization, the concentration of Ti in the $Nd_2Fe_{14}B$ crystal grains is preferably about 2 at % or less, more preferably about 1.8 at % or less. The Ti concentration in the $Nd_2Fe_{14}B$ crystal grains is most preferably about 1.65 at % or less to further increase the magnetization.

The concentration of Cr or V in the grain boundary zones of the comparative examples was not so much different from the concentration of Ti in the grain boundary zones of the examples of preferred embodiments of the present invention. However, since no Ti was added in the comparative examples, the structure of the comparative examples should be totally different from that of the examples of preferred embodiments of the present invention. That is to say, the desired structure, in which the iron-based boride with high magnetization is either finely dispersed in, or present in the form of a film over, the thin grain boundary phases of the $Nd_2Fe_{14}B$ crystal grains, should not have been formed in any of the comparative examples. The reason is that since no Ti was added in the comparative examples, the crystal grains of the $Nd_2Fe_{14}B$ type compound cannot have nucleated faster and earlier than the α-Fe phase.

Also, in the comparative examples in which Cr or V was added instead of Ti, the iron-based boride with high magnetization was not produced so much in the grain boundary zones but an $Nd_2Fe_{14}B$ phase including a lot of Cr or V was produced there instead. As a result, the magnetization decreased and the remanence $B_r$ of the resultant magnet was less than about 0.8 T.

The iron-based rare earth alloy magnet according to the preferred embodiments of the present invention described above has a unique structure in which the iron-based boride existing in the grain boundary zones covers the crystal grains having hard magnetic properties. Thus, the iron-based rare earth alloy magnet exhibits improved anticorrosiveness as well. Generally speaking, an iron-based rare earth alloy magnet, including an $R_2T_{14}Q$ type phase with hard magnetic properties, shows inferior oxidation resistance and anticorrosiveness unless treated in some way or other. This is because the $R_2T_{14}Q$ type phase includes an easily oxidizable rare earth element R at a high concentration. However, in the preferred embodiments of the present invention, the crystal grains of the $R_2T_{14}Q$ type compound are covered with the iron-based boride in the grain boundary zones with a low R concentration. Accordingly, the oxidation or corrosion stops at the grain boundary zones and excessive oxidation or corrosion is reliably prevented. In addition, Ti, existing at a relatively high concentration in the grain boundary zones, also contributes to increasing the oxidation resistance and anticorrosiveness. This is because Ti is a metal element having high chemical stability. Furthermore, this structure can also adjust the exchange coupling appropriately, thus realizing an excellent magnet in which coercivity and remanence are well balanced.

According to various preferred embodiments of the present invention, a melt of a material alloy, including an additive Ti, is rapidly cooled and solidified, thereby realizing a permanent magnet that exhibits excellent magnetic properties, including high coercivity and high magnetization, while reducing the minimum required amount of a rare earth element to be included in the magnet.

Also, according to various preferred embodiments of the present invention, even if a rapidly solidified alloy is prepared by a melt quenching process at a decreased cooling rate, the addition of Ti effectively prevents the precipitation of the α-Fe phase during the melt quenching process. Therefore, a strip casting method, or a melt quenching process resulting in a relatively low cooling rate and suitably applicable to mass production, can be adopted, thus reducing the manufacturing cost advantageously.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

The invention claimed is:

1. An iron-based rare earth alloy nanocomposite magnet having a composition represented by the general formula: $(Fe_{1-m}T_m)_{100-x-y-z}Q_xR_yTi_z$, where T is at least one element selected from the group consisting of Co and Ni; Q is at least one element selected from the group consisting of B and C; and R is at least one rare earth element including no La or Ce, the mole fractions x, y, z and m satisfying the inequalities of:

10 at % < x ≦ 17 at %;
7 at % ≦ y < 10 at %;
0.5 at % ≦ z ≦ 6 at %; and
0 ≦ m ≦ 0.5, respectively; wherein
crystal grains of an $R_2T_{14}Q$ type compound have an average grain size of about 20 nm to about 200 nm;
crystal grains of a ferromagnetic iron-based boride have an average crystal grain size smaller than the crystal grain size of the crystal grains of the $R_2T_{14}Q$ type compound; and
the ferromagnetic iron-based boride is a soft magnetic phase and is dispersed in the grain boundary or present in the form of a film over the grain boundary to cover at least partially the surfaces of the crystal grains of the $R_2T_{14}Q$ type compound.

2. The magnet of claim 1, wherein the mole fractions x, y and z satisfy the inequalities of:

10 at %$<x\leq$15 at %;

7 at %$\leq y\leq$9.3 at %; and 1.5 at %$\leq z\leq$5 at %.

3. The magnet of claim 1, wherein the magnet further comprises crystalline phases, including the $R_2T_{14}Q$ type compound and the ferromagnetic iron-based boride, at about 95 vol % or more in total, and amorphous phases at about 5 vol % or less.

4. The magnet of claim 3, wherein the magnet comprises the $R_2T_{14}Q$ type compound at about 65 vol % to about 85 vol %.

5. The magnet of claim 1, wherein the crystal grains of the $R_2T_{14}Q$ type compound have a Ti concentration of about 2 at % or less, and a Ti concentration in the grain boundary between the crystal grains of the $R_2T_{14}Q$ type compound is higher than the Ti concentration inside the crystal grains of the $R_2T_{14}Q$ type compound.

6. The magnet of claim 5, wherein the Ti concentration in the grain boundary between the crystal grains of the $R_2T_{14}Q$ type compound is about 7 at % or more.

7. The magnet of claim 1, wherein the ferromagnetic iron-based boride has an average size of about 50 nm or less as measured along a thickness of the grain boundary.

8. The magnet of claim 1, wherein the ferromagnetic iron-based boride is present in the form of a film having an average thickness of about 20 nm or less over the grain boundary between the crystal grains of the $R_2T_{14}Q$ type compound.

9. The magnet of claim 1, wherein the ferromagnetic iron-based boride exists in the grain boundary between the crystal grains of the $R_2T_{14}Q$ type compound and has an average major axis length of about 1 nm to about 50 nm.

10. The magnet of claim 1, wherein on an arbitrary cross section of the magnet, the crystal grains of the $R_2T_{14}Q$ type compound have an average size that is greater than an average size of the ferromagnetic iron-based boride.

11. The magnet of claim 1, wherein the mole fractions x and z satisfy the inequalities of:

10 at %$<x\leq$14 at % and 0.5 at %$\leq z\leq$4 at %.

12. The magnet of claim 1, wherein the ferromagnetic iron-based boride comprises at least one of $Fe_3B$ and $Fe_{23}B_6$.

13. The magnet of claim 1, wherein the magnet has a thin strip shape having a thickness of about 10 μm to about 300 μm.

14. The magnet of claim 1, wherein the magnet has been pulverized into powder particles.

15. The magnet of claim 14, wherein the powder particles have a mean particle size of about 30 μm to about 250 μm.

16. The magnet of claim 1, wherein the magnet has a remanence $B_r$ of about 0.80 T or more, a maximum energy product $(BH)_{max}$ of about 100 kJ/m³ or more and a coercivity $H_{cJ}$ of about 480 kA/m or more.

17. The magnet of claim 1, wherein the magnet has a remanence $B_r$ of about 0.85 T or more and a maximum energy product $(BH)_{max}$ of about 120 kJ/m³ or more.

18. A bonded magnet obtained by molding a magnet powder, comprising a powder of the iron-based rare earth alloy magnet according to claim 14, with a resin binder.

19. A bonded magnet obtained by molding a magnet powder, comprising a powder of the iron-based rare earth alloy magnet according to claim 15, with a resin binder.

* * * * *